United States Patent
Wohlert

(10) Patent No.: US 9,806,997 B2
(45) Date of Patent: Oct. 31, 2017

(54) SERVICE SPECIFIC ROUTE SELECTION IN COMMUNICATION NETWORKS

(71) Applicant: AT&T Intellectual Property I, L.P., Atlanta, GA (US)

(72) Inventor: Randolph Wohlert, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 101 days.

(21) Appl. No.: 14/741,216

(22) Filed: Jun. 16, 2015

(65) Prior Publication Data

US 2016/0373344 A1 Dec. 22, 2016

(51) Int. Cl.
*H04L 12/721* (2013.01)
*H04L 12/725* (2013.01)

(52) U.S. Cl.
CPC .......... *H04L 45/302* (2013.01); *H04L 45/306* (2013.01)

(58) Field of Classification Search
CPC ................................................... H04L 45/302
See application file for complete search history.

(56) References Cited

U.S. PATENT DOCUMENTS

| | | |
|---|---|---|
| 6,985,447 B2 | 1/2006 | Gibson et al. |
| 8,639,260 B2 | 1/2014 | Fox et al. |
| 8,855,014 B2 | 10/2014 | Previdi et al. |
| 8,879,416 B2 | 11/2014 | Mishra et al. |
| 8,942,226 B2 | 1/2015 | Ong |
| 8,953,500 B1 | 2/2015 | Shen et al. |

(Continued)

FOREIGN PATENT DOCUMENTS

| | | |
|---|---|---|
| WO | 2014046875 | 3/2014 |
| WO | 2014139564 | 9/2014 |

(Continued)

OTHER PUBLICATIONS

Akyildiz, Ian F., et al., "A roadmap for traffic engineering in SDN-OpenFlow networks", Computer Networks 71 (2014) <http://www.ece.gatech.edu/research/labs/bwn/projects/sdn-tecs/SDN-TE-survey.pdf>(pp. 1-30).

(Continued)

*Primary Examiner* — Robert C Scheibel
(74) *Attorney, Agent, or Firm* — Hanley, Flight & Zimmerman, LLC

(57) ABSTRACT

Methods, apparatus and articles of manufacture (e.g., physical storage media) to perform service specific route selection in communication networks are disclosed. Example route selection methods disclosed herein include determining respective component performance parameters for network components of a communication network based on a weighting profile associated with a first service from a plurality of different services for which traffic is to be routed in the communication network. Disclosed example route selection methods also include determining, based on the component performance parameters, respective path performance parameters for a plurality of candidate paths between two endpoints in the communication network. Disclosed example route selection methods further include selecting, based on the path performance parameters, a first one of the candidate paths to route traffic for the first service between the two endpoints.

20 Claims, 13 Drawing Sheets

(56) References Cited

U.S. PATENT DOCUMENTS

| | | | |
|---|---|---|---|
| 9,124,652 B1* | 9/2015 | Jain | H04L 67/327 |
| 9,609,051 B2* | 3/2017 | Li | H04L 67/1004 |
| 2005/0180356 A1 | 8/2005 | Gillies et al. | |
| 2006/0092977 A1* | 5/2006 | Bai | G06F 13/4022 |
| | | | 370/469 |
| 2012/0008503 A1* | 1/2012 | Qiu | H04L 43/0882 |
| | | | 370/238 |
| 2013/0266007 A1 | 10/2013 | Kumbhare et al. | |
| 2013/0322447 A1 | 12/2013 | DeCusatis et al. | |
| 2013/0329601 A1 | 12/2013 | Yin et al. | |
| 2013/0331114 A1 | 12/2013 | Gormley et al. | |
| 2014/0189060 A1 | 7/2014 | Westphal | |
| 2014/0192811 A1 | 7/2014 | Hallivuori et al. | |
| 2014/0204764 A1* | 7/2014 | Kumar | H04L 45/302 |
| | | | 370/241 |
| 2014/0280864 A1 | 9/2014 | Yin et al. | |
| 2014/0282628 A1 | 9/2014 | Pruss et al. | |
| 2014/0331280 A1 | 11/2014 | Porras et al. | |
| 2015/0003283 A1 | 1/2015 | Previdi et al. | |
| 2015/0043383 A1 | 2/2015 | Farkas et al. | |
| 2015/0043589 A1 | 2/2015 | Han et al. | |
| 2015/0063112 A1 | 3/2015 | Wu et al. | |
| 2015/0078381 A1 | 3/2015 | Willis | |
| 2015/0120829 A1 | 4/2015 | Johnson et al. | |

FOREIGN PATENT DOCUMENTS

| | | |
|---|---|---|
| WO | 2014184625 | 11/2014 |
| WO | 2015023537 | 2/2015 |
| WO | 2015036023 | 3/2015 |

OTHER PUBLICATIONS

Durr, Frank, "Towards Cloud-assisted Software-defined Networking", Technical Report Apr. 2012, IPVS, Aug. 2012 (19 pages).

Jain, Sushant, et al., "B4: Experience with Globally-Deployed Software Defined WAN", ACM SIGCOMM Computer Communication Review, vol. 43, No. 4. ACM, 2013 (12 pages).

Hiroki, Kashiwazaki, "Studiees on Adaptive Routing for a Wide-Area Overlay Network System", Jun. 3, 2014 (104 pages).

Nunes, Bruno, et al., "A Survey of Software-Defined Networking: Past, Present, and Future of Programmable Networks", HAL, <https:/hal.inria.fr/hal-00825087v5>, Jan. 19, 2014 (19 pages).

Sezer, Sakir, et al., "Are We Ready for SDN? Implementation Challenges for Software-Defined Networks", Future Carrier Networks, IEEE Communications Magazine, Jul. 2013 (43 pages).

U.S. Appl. No. 14/559,676, filed Dec. 3, 2014 (39 pages).

* cited by examiner

| QCI | Bearer Type | Priority | Packet Delay | Packet Loss | Example |
|---|---|---|---|---|---|
| 1 | GBR | 2 | 100 ms | $10^{-2}$ | VoIP call |
| 2 | GBR | 4 | 150 ms | $10^{-3}$ | Video call |
| 3 | GBR | 3 | 50 ms | $10^{-3}$ | Online Gaming (Real Time) |
| 4 | GBR | 5 | 300 ms | $10^{-6}$ | Video streaming |
| 5 | Non-GBR | 1 | 100 ms | $10^{-6}$ | IMS Signaling |
| 6 | Non-GBR | 6 | 300 ms | $10^{-6}$ | Video, TCP based services e.g. email, chat, ftp etc |
| 7 | Non-GBR | 7 | 100 ms | $10^{-3}$ | Voice, Video, Interactive gaming |
| 8 | Non-GBR | 8 | 300 ms | $10^{-6}$ | Video, TCP based services e.g. email, chat, ftp etc |
| 9 | Non-GBR | 9 | 300 ms | $10^{-6}$ | Video, TCP based services e.g. email, chat, ftp etc |

Table 1

FIG. 11

SERVICE SPECIFIC ROUTE SELECTION IN COMMUNICATION NETWORKS

FIELD OF THE DISCLOSURE

This disclosure relates generally to network routing and, more particularly, to service specific route selection in communication networks.

BACKGROUND

In software defined networks (SDNs), data plane processing, which includes the physical forwarding of data between endpoints in the network, is decoupled from control plane processing, which includes making decisions concerning which routes in the SDN are to be used to forward the data between the network endpoints. Due to this decoupling, it is expected that routing decisions for at least some future SDNs will be made by a centralized network controller residing in the cloud. However, many route determination techniques employed in existing communication networks assume routing decisions are decentralized and performed at individual nodes (e.g., routers) in the network, rather than at a centralized point, such as a cloud-based, centralized network controller.

BRIEF DESCRIPTION OF THE DRAWINGS

FIG. 11 includes a table, Table 1, that illustrates example performance characteristics, such as packet delay requirements, packet loss requirements, etc., for different example services.

Wherever possible, the same reference numbers will be used throughout the drawing(s) and accompanying written description to refer to the same or like parts, elements, etc.

DETAILED DESCRIPTION

Figure 1:
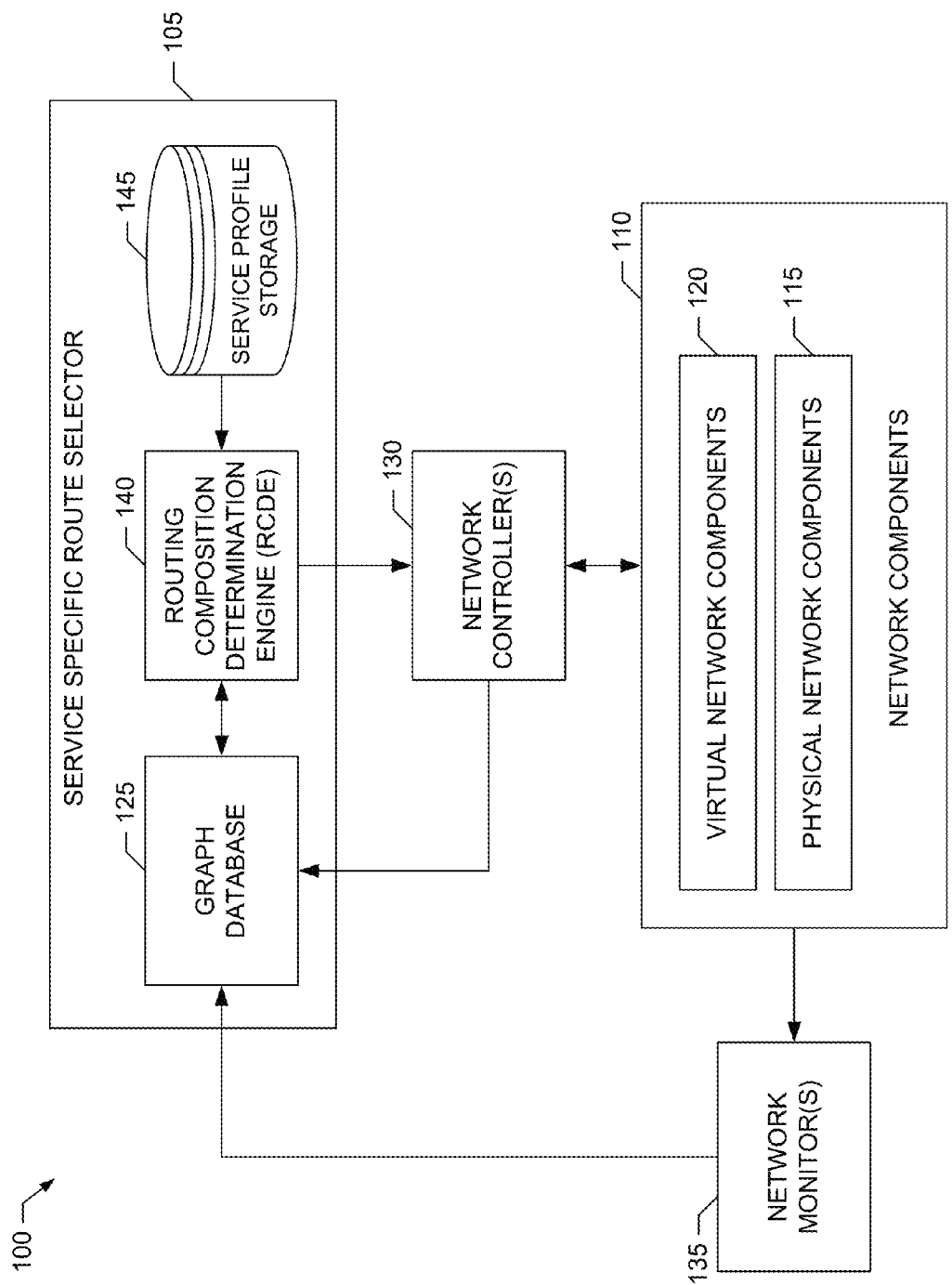
FIG. 1 is a block diagram of an example communication network including an example service specific route selector to perform service specific route selection in accordance with the teachings of this disclosure.

Methods, apparatus and articles of manufacture (e.g., physical storage media) to perform service specific route selection in communication networks are disclosed herein. Example route selection methods disclosed herein include determining respective component performance parameters (also referred to herein as component relative performance parameters, and which may be service specific) for network components of a communication network based on a weighting profile associated with a first service from a group of different services for which traffic is to be routed in the communication network. Disclosed example route selection methods also include determining, based on the component performance parameters, respective path performance parameters (also referred to herein as path relative performance parameters, which may be service specific) for a group of candidate paths between two endpoints in the communication network (e.g., between which traffic for the first service is to be routed). Disclosed example route selection methods further include selecting, based on the path performance parameters, a first one of the candidate paths to route traffic for the first service between the two endpoints.

In some disclosed example methods, determining the component performance parameters includes determining a set of mapped performance parameters from a set of performance measurements associated with a first one of the network components. In some such disclosed example methods, determining the component performance parameters also includes weighting the set of mapped performance parameters based on the weighting profile to determine a weighted set of mapped performance parameters associated with the first service. In some such disclosed example methods, determining the component performance parameters further includes combining the weighted set of mapped performance parameters to determine a first one of the component performance parameters for the first one of the network components. In some such disclosed example methods, determining the set of mapped performance parameters includes performing a first mapping to map a first one of the set of performance measurements to a first one of the set of mapped performance parameters, and performing a second mapping, different from the first mapping, to map a second one of the set of performance measurements to a second one of the set of mapped performance parameters.

Additionally or alternatively, in some disclosed example methods, determining the path performance parameters includes combining a first group of component performance parameters for a first group of network components included in a first one of the candidate paths to determine a first one of the path performance parameters for the first one of the candidate paths. In some disclosed example methods, determining the path performance parameters also includes combining a second group of component performance parameters for a second group of network components included in a second one of the candidate paths to determine a second one of the path performance parameters for the second one of the candidate paths.

Additionally or alternatively, some disclosed example methods further include querying a graphical database storing topology information for the communication network to obtain performance measurements for the network components and to identify the plurality of candidate paths. In some such disclosed example methods, determining the component performance parameters includes determining a first one of the component performance parameters for a first one of the network components by combining the performance measurements for the first one of the network components (e.g., after being mapped to mapped performance parameters) based on the weighting profile associated with the first service.

Additionally or alternatively, in some disclosed example methods, the weighting profile is a first weighting profile, the component performance parameters are first component performance parameters, and the path performance parameters are first path performance parameters. Some such disclosed example methods include determining respective second component performance parameters for the network components based on a second weighting profile, different from the first weighting profile, associated with a second service from the plurality of different services. Some such disclosed example methods also include determining, based on the second component performance parameters, respective second path performance parameters for the plurality of candidate paths between the two endpoints in the communication network. Some such disclosed example methods further include selecting, based on the second path performance parameters, a second one of the candidate paths, different from the first one of the candidate paths, to route traffic for the second service between the two endpoints.

Additionally or alternatively, some disclosed example methods further include transmitting routing information descriptive of the first one of the candidate paths to at least a first group of network components implementing the first one of the candidate paths to cause the traffic for the first service to be routed between the two endpoints according to the first one of the candidate paths.

These and other example methods, apparatus, systems and articles of manufacture (e.g., physical storage media) to implement service specific route selection in communication networks are disclosed in greater detail below.

As noted above, in at least some future SDNs, routing decisions for routing traffic for different services between pairs of endpoints in the network will likely be made in a centralized network controller (e.g., residing in the cloud). However, route determination techniques employed in existing communication networks typically assume routing decisions are decentralized and performed at individual nodes (e.g., routers) in the network, rather than at a centralized point, such as a cloud-based, centralized network controller. For example, some prior approaches for determining routes between endpoints in a network rely on each node in the network performing an individual routing algorithm (e.g., such as the open shortest path first algorithm) to incrementally select the next node to which incoming traffic received at the node is to be routed. However, such prior decentralized routing techniques lack a centralized, or global, view of the network and, as such, may be unable to provide globally optimal routing solutions, and may be slow to respond to changes in the network topology.

In SDNs, the need exists to dynamically determine globally optimal routes (e.g., paths) for traffic (e.g., packets, flows, etc.) between endpoints (such as from an ingress endpoint to an egress endpoint) in the network. This can be especially challenging in SDNs because the network topography may change dynamically as nodes (e.g., virtual and/or physical nodes) and/or interconnecting links (virtual and/or physical) are added and/or removed from the network. Additionally, the requirements (e.g., rules, policies, etc.) for traffic routing behavior may vary depending on the service for which the traffic is being routed. For example, voice, video, messaging, data transfer, and other new and innovative services may have different traffic routing requirements Unlike the prior, decentralized routing techniques mentioned above, example methods, apparatus, systems and articles of manufacture (e.g., physical storage media) disclosed herein implement centralized, service specific route selection in networks, such as, but not limited to, SDNs. As disclosed in further detail below, such centralized, service specific route selection can provide real-time, autonomous routing in SDNs (and/or other networks) that is able to accommodate changing network topologies and service requirements. In some examples, centralized, service specific route selection, as disclosed herein, is implemented by a service specific route selector that includes a routing composition determination engine to (i) determine service-specific performance parameters for components in the network and (ii) identify, based on the service-specific performance parameters, paths for routing traffic for different services in the network. In some disclosed examples, the service specific route selector also includes a graph database to maintain network topology information for the network (e.g., SDN) for which routing decisions are to be made.

Turning to the figures, a block diagram of an example communication network 100 including an example service specific route selector 105 to perform service specific route selection in accordance with the teachings of this disclosure is illustrated in FIG. 1. The example communication network 100 of FIG. 1 includes example network components 110 forming a network topology capable of routing traffic (e.g., packets, flows, etc.) between endpoints of the network 100. The example network components 110 include network nodes and network links interconnecting the nodes. For example, the nodes in the example network components 110 may include, but are not limited to, switches, routers, gateways, etc., or any combination thereof. The links in the example network components 110 may include, but are not limited to, dedicated links, shared links, optical links, wireless links, etc., or any combination thereof. Furthermore, the network nodes in the example network components 110 may be physical nodes and/or virtual nodes, and the network links in the example network components 110 may be physical links and/or virtual links. Accordingly, the example network components 110 include example physical network components 115 and/or example virtual network components 120.

In the illustrated example of FIG. 1, the service specific route selector 105 includes an example graph database 125 to store network topology information representing the arrangement(s) of the network components 110 in the example network 100. The example graph database 125 utilizes graph nodes, graph edges and properties to represent and store data. Elements in the graph database 125 contain pointers to adjacent elements to avoid the need for the index lookups associated with conventional relational databases. For example, the nodes in the network components 110 can be represented in the graph database 125 with graph nodes and associated properties, the links in the network components 110 can be represented in the graph database 125 with graph edges and associated properties, and the interconnections of the nodes and links of the network components 110 can be represented in the graph database 125 using pointers between the appropriate graph nodes and graph edges.

The network topology information stored by the graph database 125 includes information specifying the components 110 (e.g., nodes, links, etc.) included in the network, the arrangement (e.g., interconnections) of the components 110, performance measurements (e.g., delay, jitter, path loss, bandwidth, reliability, etc.) for the different components 110, etc. In some examples, the graph database 125 receives the network topology information from one or more example network controllers 130, such as one or more SDN controllers 130, responsible for (i) managing the addition and removal of network components 110 to/from the network 100, (ii) downloading routing information to the network components, and (iii) monitoring the performance of the network components 110. In some examples, the performance measurements stored in the graph database 125 for respective ones of the example network components 110 can additionally or alternatively be obtained by one or more example network monitor(s) 135, such as one or more network taps, traffic monitors, etc. In some examples, the network controller(s) 130 and/or the network monitor(s) 135 query respective ones of the example network components 110 for status information including performance measurements (e.g., delay, jitter, path loss, bandwidth, reliability, etc.), utilization measurements (e.g., capacity, power consumption, etc.), for the network components 110. In some examples, the set of performance measurements obtained for a given network component are stored in the graph database 125 with the topology information describing the given network component.

The example service specific route selector 105 of FIG. 1 also includes an example routing composition determination engine (RCDE) 140 to select paths for routing traffic (e.g., packets, flows, etc.) for different services in the network 100. A path corresponds to a set of nodes and links in the network components 110 via which traffic can be routed from one endpoint (e.g., an ingress endpoint, such as an ingress node) to another endpoint (e.g., an egress endpoint, such as an egress node) in the network 100. In the illustrated example of FIG. 1, the RCDE 140 utilizes the topology information stored in the example graph database 125 and respective weighting profiles for the different services to perform path selection. Accordingly, the example service specific route selector 105 of FIG. 1 further includes an example service profile storage 145 to store the weighting profiles for different services for which traffic is to be routed in the network 100. The example service profile storage 145 may be implemented by any number(s) and/or type(s) of volatile and/or non-volatile memory, storage, etc., or combination(s) thereof, such as the example volatile memory 1014 and/or the example mass storage device(s) 1028 included in the example of FIG. 10.

As disclosed in further detail below, the example RCDE 140 performs route selection by (i) determining service-specific performance parameters for respective ones of the network components 110 and (ii) selecting, for a given service and a given pair of endpoints, a path to route traffic for the given service between the given pair of endpoints based on the service-specific performance parameters. For example, and as disclosed in further detail below, the RCDE 140 determines, for a given service, a service-specific performance parameter (e.g., corresponding to a component relative performance parameter, which is disclosed in further detail below) for a given one of the network components 110 by processing the performance measurements stored in the graph database 125 for the given one of the network components 110 based on a weighting profile stored in the service profile storage 145 for that service. As also disclosed in further detail below, to select a path to route traffic for the given service between two endpoints, the example RCDE 140 queries the graph database 125 to identify a set of candidate paths capable of routing traffic between the two endpoints. The example RCDE 140 also determines respective service-specific performance parameters (e.g., corresponding to path relative performance parameters, which are disclosed in further detail below) for respective ones of the candidate paths by combining the service-specific performance parameters (e.g., the component relative performance parameters) determined for those network components 110 included in the respective candidate paths. The example RCDE 140 then selects one (or more) of the candidate paths to be the path (or paths) to route the traffic for the given service based on comparing the service-specific performance parameters (e.g., the path relative performance parameters) determined for different candidate paths.

After selecting a path to route traffic for the given service between the two endpoints, the example RCDE 140 transmits routing information descriptive of the selected path(s) to the network controller(s) 130. The network controller(s) 130, in turn, transmit the routing information to the appropriate network components 110 to cause traffic for the given service to be routed between the two endpoints according to the selected path(s). For example, the routing information may be transmitted to the network components 110 included in the selected path(s) to cause those network components 110 to update their routing tables to route traffic for the given service according to the selected path(s).

Because the performance parameters determined and used by the example RCDE 140 to perform route selection are service-specific, the RCDE 140 may select the same path or different paths to route traffic for different services between the same pair of network endpoints. Also, in some examples, the RCDE 140 is able to update path selections when, for example, updated performance measurement are detected, changes in the network topology information (e.g., due to network component additions and/or deletions) are detected, services are added and/or deleted, etc.

Although the example service specific route selector 105 of FIG. 1 is depicted as being separate from the example network controller(s) 130, in some examples, the example service specific route selector 105 is implemented by one or more of the network controller(s) 130. Also, although the example service specific route selector 105 of FIG. 1 is described in the context of the example network 100 being an SDN, service specific route selection as disclosed herein is not limited thereto. For example, the example service specific route selector 105 can be utilized to perform route selection in any network in which information describing the network components included in paths between endpoints is available.

Figure 2:
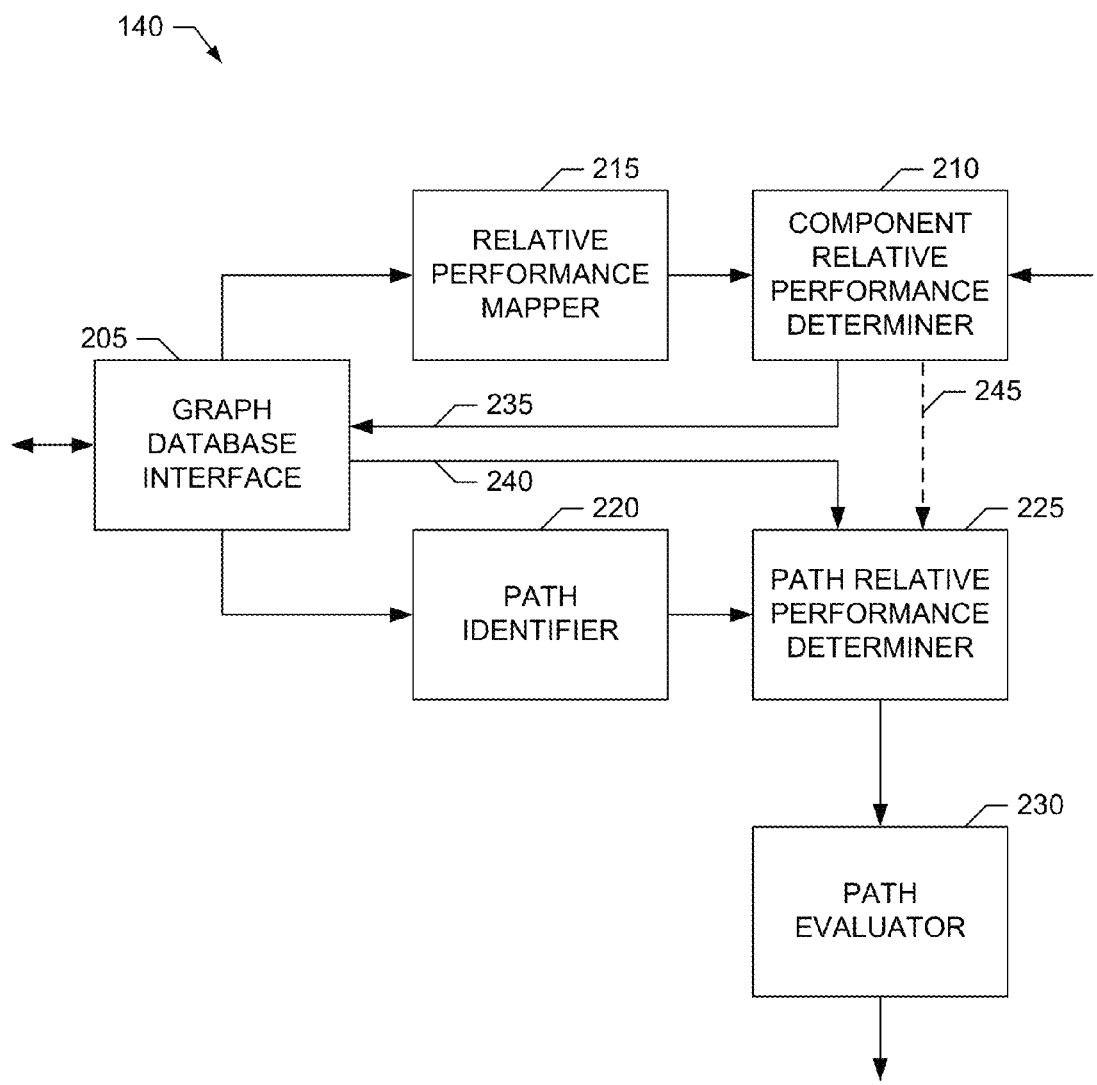
FIG. 2 is a block diagram illustrating an example implementation of the example service specific route selector of FIG. 1.

A block diagram of an example implementation of the RCDE 140 of FIG. 1 is illustrated in FIG. 2. The example RCDE 140 of FIG. 2 includes an example graph database interface 205 to interface the RCDE 140 with a graph database, such as the example graph database 125 of FIG. 1. For example, the graph database interface 205 is structured to send queries to the graph database 125 to retrieve, for example, sets of performance measurements for the example network components 110, sets of the candidate paths for routing traffic between pairs of endpoints in the network 100, etc. The example graph database interface 205 can be implemented by any type(s), number(s) and/or combination (s) of interfaces, such as the example interface circuit 1020 of FIG. 10, which is described in further detail below.

The example RCDE 140 of FIG. 1 also includes an example component relative performance (CRP) determiner 210 to determine respective CRP parameters for the different network components 110 included in the network 100 (e.g., SDN) for which routing decisions are to be made. For example, for a given network component (e.g., node, link, etc.), the CRP determiner 210 determines a respective CRP parameter for each service for which traffic (e.g., packets, flows, etc.) may be routed via the network component. The CRP parameter is a single value that characterizes the relative performance of the network component for routing data associated with a given service. As such, a given network component may have different CRP parameters for different services.

In some examples, the CRP parameter determined by the example CRP determiner 210 for a given network component 110 and a given network service is a dimensionless parameter determined from the performance measurements (e.g., delay, jitter, packet loss, bandwidth, reliability, etc.) maintained in a graph database, such as the graph database 125, for the given network component. To facilitate determination of CRP parameters from combinations of measurements having different ranges of values, the example RCDE 140 of FIG. 2 includes an example relative performance mapper 215 to map, for a given network component, performance measurements (e.g., delay, jitter, packet loss, bandwidth, reliability, etc.), which may have different respective ranges of values, to corresponding mapped performance parameters, which have a common range of values. The mapping for a given performance measurement may be linear or nonlinear depending on the possible range of values for the given performance measurement. The mapping may be implemented by look-up tables, normalization functions (e.g., that normalize a range of inputs to a range of normalized outputs), etc.

For example, if the possible packet delay for a given network component lies in the range of 2 milliseconds (ms.) (best case) to 40 ms. (worst case), the relative performance mapper 215 may employ a linear mapping to map a measured delay for the given network component to mapped delay parameter that is a dimensionless number in the range of 100 (best case, corresponding to 2 ms.) to 1 (worst case, corresponding to 40 ms.). In such an example, a measured delay of 3 ms. for a network component (e.g., a link) may map to a mapped delay parameter of, for example, 97. As another example, if the possible packet loss for a given network component lies in the range of $10^{-2}$ (worst case) to $10^{-6}$ (best case), the relative performance mapper 215 may employ a nonlinear (e.g., logarithmic) mapping to map measured packet loss for the given network component to a mapped packet loss parameter that is a dimensionless number in the range of 100 (best case, corresponding to $10^{-6}$) to 1 (worst case, corresponding to $10^{-2}$). In such an example, a measured packet loss of $10^{-4}$ for a network component (e.g., a link) may map to a mapped packet loss parameter of, for example, 50. In some examples, although the different performance measurements for a given network component may have different ranges and dimensions, the corresponding mapped performance parameters for these different performance measurements are dimensionless and have the same ranges (e.g., from 1, which is worst case, to 100, which is best case, or some other range).

In the illustrated example of FIG. 2, the example CRP determiner 210 uses the mapped performance parameters determined by the relative performance mapper 215 for a given network component 110 to determine a particular CRP parameter for a particular service to be routed by the network component 110. In some examples, for a given network component 110, the example CRP determiner 210 determines the particular CRP parameter for a particular service by weighting the mapped performance parameters for the network component 110 based on weights tailored to the particular service, and then combining (e.g., summing, multiplying, etc.) the weighted, mapped performance parameters to determine the CRP parameter for the particular service. Because different performance characteristics may have different degrees of importance for different services, the example CRP determiner 210 may use different weightings of the mapped performance parameters for a given network component 110 to determine the network component's respective CRP parameters for different services. In the illustrated example of FIG. 2, the CRP determiner 210 obtains the weights to be applied to the mapped performance parameters of a given network components 110 to determine the network component's respective CRP parameters for different services from the weighting profiles stored in the example service profile storage 145 for the different services.

For example, Table 1 of FIG. 11 illustrates example performance characteristics, such as packet delay requirements, packet loss requirements, etc., for different example services, such as voice over Internet protocol (VoIP) calls, video calls, online gaming, video streaming, Internet protocol multimedia subsystem (IMS) signaling, transmission control protocol (TCP) services, etc. The example services listed in Table 1 of FIG. 11 correspond to the $3^{rd}$ Generation Partnership Project (3GPP) quality of service (QoS) class identifiers (QCIs) and priorities also listed in Table 1 of FIG. 11. The example services listed in Table 1 of FIG. 11 can generally be classified into two service types, namely, real-time (RT) services and non-real-time (NRT) services. RT services are typically characterized by short response times between communicating endpoints and guaranteed bit rate (GBR) requirements. RT services also typically have strict requirements regarding packet delay and jitter. VoIP is an example of an RT service.

NRT services typically do not have tight requirements concerning packet delay, although high packet delays may be unacceptable. Therefore NRT services are usually non-GBR services. For NRT services, information integrity is often an important requirement and, as such, NRT services may have low tolerance for packet loss. Web browsing is an example of an NRT service Based on the example of Table 1 of FIG. 11, delay and jitter may be important performance parameters for a voice service, whereas packet loss may be an important performance parameter for a video service. Thus, in such an example, the CRP determiner 210 may apply larger weights to the relative delay and jitter measurements (after being mapped by the relative performance mapper 215, as disclosed above) and a smaller weight to the relative packet loss measurement (after being mapped by the relative performance mapper 215, as disclosed above) when determining, for a given network node, the CRP parameter corresponding to voice service traffic. Conversely, in such an example, the CRP determiner 210 may apply smaller weights to the relative delay and jitter measurements (after being mapped by the relative performance mapper 215, as disclosed above) and a larger weight to the relative packet loss measurement (after being mapped by the relative performance mapper 215, as disclosed above) when determining, for the given network node, the CRP parameter corresponding to video service traffic.

Stated mathematically, the example CRP determiner 210 determines, for respective ones of the network components 110 (e.g., nodes, links, etc.) in the network 100, a set of CRPs, with each CRP in the set of CRPs corresponding to a respective service from a set of possible services for which traffic may be routed via the network component 110. The CRP for a specific network component 110 and a specific service is represented by $CRP_{n,s}$, where $n=\{1, \ldots, N\}$ indexes over the different network components 110, and $s=\{1, \ldots, S\}$ indexes over the different possible services. The CRP determiner 210 of the illustrated example determines $CRP_{n,s}$ for a given network component, n, and a given service, s, as a summation of weighted, mapped performance parameters, $MP_{n,p}$, for the network component, n, according to Equation 1, which is:

$$CRP_{n,s} = \sum_{p=1}^{P} W_{s,p} \times MP_{n,p} \qquad \text{Equation 1}$$

In Equation 1, $MP_{n,p}$ represents the set of $p=\{1, \ldots, P\}$ mapped performance parameters determined by the relative performance mapper 215 for the given network component, n, and $W_{s,p}$ represents the set of $p=\{1, \ldots, P\}$ weights specified for a given service, s.

As disclosed above, the relative performance mapper 215 maps (e.g., normalizes) a set of performance measurements, denoted $PM_{n,p}$, $p=\{1, \ldots, P\}$, for a given network component, n, to a corresponding set of mapped performance parameters $MP_{n,p}$, $p=\{1, \ldots, P\}$. For example, the set of performance measurements, $PM_{n,p}$, for a given network component, n, may include a set of P=3 measurements, which include measured packet loss ($PM_{n,1}$), measured delay ($PM_{n,2}$) and a measured jitter ($PM_{n,3}$) for the network component. The relative performance mapper 215 of the illustrated example maps this set performance measurements, $PM_{n,p}$, to a corresponding set of P=3 mapped performance parameters, $MP_{n,p}$, which include a mapped packet loss parameter ($MP_{n,1}$), a mapped delay parameter ($MP_{n,2}$) and a mapped jitter parameter ($MP_{n,3}$) for the network component, n.

As disclosed above, the CRP determiner 210 of the illustrated example obtains the set of weights, $W_{s,p}$, for each service, s, from a weighting profile specified for the service and stored in the example service profile storage 145. For example, the weighting profile for a given service, s, may specify a first weight ($W_{s,1}$) to be applied to mapped packet loss parameters ($MP_{n,1}$), a second weight ($W_{s,2}$) to be applied to mapped delay parameters ($MP_{n,2}$) and a third weight ($W_{s,3}$) to be applied to mapped jitter parameters ($MP_{n,3}$). In some examples, the weights, $W_{s,p}$, have a range of values (e.g., such as a range from 1 to 10, a range from 1 to 100, etc.), with higher weights being assigned to more important performance parameters. For example, for a video service (e.g., indexed by s=1), the weighting profile for the video service may specify $W_{1,1}=90$ as the weight to be applied to mapped packet loss parameters ($MP_{n,1}$), $W_{1,2}=70$ as the weight to be applied to mapped delay parameters ($MP_{n,2}$) and $W_{1,3}=60$ as the weight to be applied to mapped jitter parameters ($MP_{n,3}$) (e.g., because, for this video service, packet loss may be more important than delay, which may be more important than jitter). As another example, for a VoIP service (e.g., indexed by s=2), the weighting profile for the VoIP service may specify $W_{2,1}=50$ as the weight to be applied to mapped packet loss parameters ($MP_{n,1}$), $W_{2,2}=95$ as the weight to be applied to mapped delay parameters ($MP_{n,2}$) and $W_{2,3}=75$ as the weight to be applied to mapped jitter parameters ($MP_{n,3}$) (e.g., because, for this VoIP service, delay may be more important than jitter, which may be more important than packet loss). In some examples, the weighting profiles containing the sets of weights, $W_{s,p}$, for the respective services, s, are specified by a network administrator and/or other user, and may be updated as service requirements change, as new services are added, as existing services are deleted, etc.

The example RCDE 140 of FIG. 2 also uses the service-specific CRP parameters determined by the example CRP determiner 210 for the different network components 110 of the network 100 to identify paths to route packets for given services from given ingress endpoints (e.g., ingress nodes) to given egress endpoints (e.g., egress nodes) of the network 100. In the illustrated example of FIG. 2, to identify a path to route packets for a given service from a particular ingress endpoint to a particular egress endpoint, the RCDE 140 includes an example path identifier 220 to query, via the graph database interface 205, a graph database, such as the graph database 125, to obtain a set of candidate paths that includes some or all of the possible paths for routing traffic (e.g., packets, flows, etc.) between the ingress endpoint to the egress endpoint. In some examples, the path identifier 220 performs one or more pre-selection/filtering operations to reduce the set of possible paths returned by the graph database 125 for routing traffic (e.g., packets, flows, etc.) between the ingress endpoint to the egress endpoint to a more manageable set of candidate paths. For example, the path identifier 220 may exclude possible path(s) from the set of candidate paths that include a number of hops that exceeds a first threshold number, include a number of network components (e.g., nodes and/or links) that exceed a second threshold number, etc.

To characterize the relative performance of the different candidate paths for routing traffic for different services, the example RCDE 140 of FIG. 2 includes an example path relative performance (PRP) parameter determiner 225. In the illustrated example of FIG. 2, the PRP determiner 225 determines a respective PRP parameter for each one of the set of candidate paths identified by the path identifier 220 for routing traffic between a given pair of endpoints for a particular service. If the same candidate path is identified for routing traffic for multiple, different services between the same pair of network endpoints, the PRP determiner 225 of the illustrated example determines respective PRP parameters for each different service. In some examples, the PRP determiner 225 determines a PRP parameter for a particular candidate path and a particular service by combining (e.g., summing, multiplying, etc.) the particular service's CRP parameters determined by the example CRP determiner 210 for each network component 110 included in the candidate path.

Stated mathematically, the example PRP determiner 225 determines a set of PRPs for a set of candidate paths, or routes, for routing traffic (e.g., packets, flows, etc.) for a specific service between a pair of endpoints in the network 100. Each PRP in the set of PRPs corresponds to a respective one of the set of candidate paths. The PRP for a specific candidate path and a specific service is represented by $PRP_{r,s}$, where $r=\{1, \ldots, R\}$ indexes over the different candidate paths in the set of candidate paths identified between the pair of endpoints, and s={1, ..., S} indexes over the different possible services. The PRP determiner 225 of the illustrated example determines the PRP parameter, $PRP_{r,s}$, for a given candidate path, r, and a given service, s, as a summation of the CRP parameters, $CRP_{n,s}$, of the network components included in the candidate path, r, according to Equation 2, which is:

$$PRP_{r,s} = \sum_{n=1}^{N_r} CRP_{n,s} \quad \text{Equation 2}$$

In Equation 2, the summation is over the $N_r$ network components included in the candidate path, r. (Different candidate paths will generally include one or more different network components.) As illustrated by Equation 2, the example PRP determiner 225 may determine, for a given candidate path, r, different PRP parameters, $PRP_{r,s}$, for different services. For example, for a given candidate path, r, the PRP determiner 225 may determine a first PRP parameter ($PRP_{r,1}$) for a video service (e.g., indexed by s=1) and a second PRP parameter ($PRP_{r,2}$) for a VoIP service (e.g., indexed by s=2).

The example RCDE 140 of FIG. 2 further includes an example path evaluator 230 to evaluate the PRP parameters determined for a set of candidate paths and select one (or more) of the paths for routing packets between an ingress endpoint to an egress endpoint in the network 100. In some examples, for a given service, the path evaluator 230 selects the path for routing traffic between a pair of endpoints to be the candidate path with the best (e.g., highest) PRP parameter for that service. In the case of multipath routing, the example path evaluator 230 may select a subset of M of the candidate paths having the M best (e.g., highest) PRP parameters for a given service to route packets between the pair of endpoints for the given service. Because different services may have different CRP parameters for a given network component, different paths may have different PRP parameters for a given service. As such, for the same ingress and egress endpoints, the path selected by the path evaluator 230 for routing packets for one service may be different from the path selected by the path evaluator 230 for routing packets for another, different service.

In the illustrated example of FIG. 2, the path evaluator 230 transmits routing information describing the path(s) selected for routing traffic (e.g., packets, flows, etc.) for different services between different ingress endpoints and different egress points in the network 100 to one or more network controllers, such as the network controller(s) 130. The network controller(s) 130, in turn, transmit this routing information to the appropriate network components 110, which, for example, update their respective routing tables to cause traffic for the different services to be routed in the network 100 according to the selected path(s). For example, the network components 110 can utilize header information, such as type of service (ToS) header fields, included in received traffic to identify the service associated with the traffic, and then route the traffic according to the service specific paths/routes selected by the example RCDE 140.

As disclosed above, in some examples, the example PRP determiner 225 uses the sets of CRP parameters determined by the example CRP determiner 210 for the respective network components 110 in the network 100 to determine the PRP parameters for respective ones of a set of candidate paths for routing traffic for a given service between a given pair of network endpoints. In some examples, the CRP determiner 210 stores the sets of CRP parameters determined for the respective network components 110 in the graph database 125 for subsequent retrieval by the PRP determiner 225 (which is represented by solid lines 235 and 240 in the illustrated example of FIG. 2). For example, the CRP determiner 210 may use the graph database interface 205 to store a set of CRP parameters determined for a given network component 110 with the topology information maintained by the graph database 125 for that network component. In some such examples, the PRP determiner 225 may use the graph database interface 205 to query the graph database 125 to retrieve the sets of CRP parameters for the network components 110 included in the candidate paths identified by the example path identifier 220.

Additionally or alternatively, in some examples, the CRP determiner 210 determines the sets of CRP parameters for given network components 110 as they are needed by the PRP determiner 225 for determining PRP parameters (which is represented by a dashed line 245 in the illustrated example of FIG. 2). For example, the CRP determiner 210 may determine the sets of CRP parameters for those network components 110 included in the candidate paths identified by the example path identifier 220, and then provide the determined sets of CRP parameters to the PRP determiner 225 for use in determining the respective PRP parameters for the candidate paths.

Figure 3:
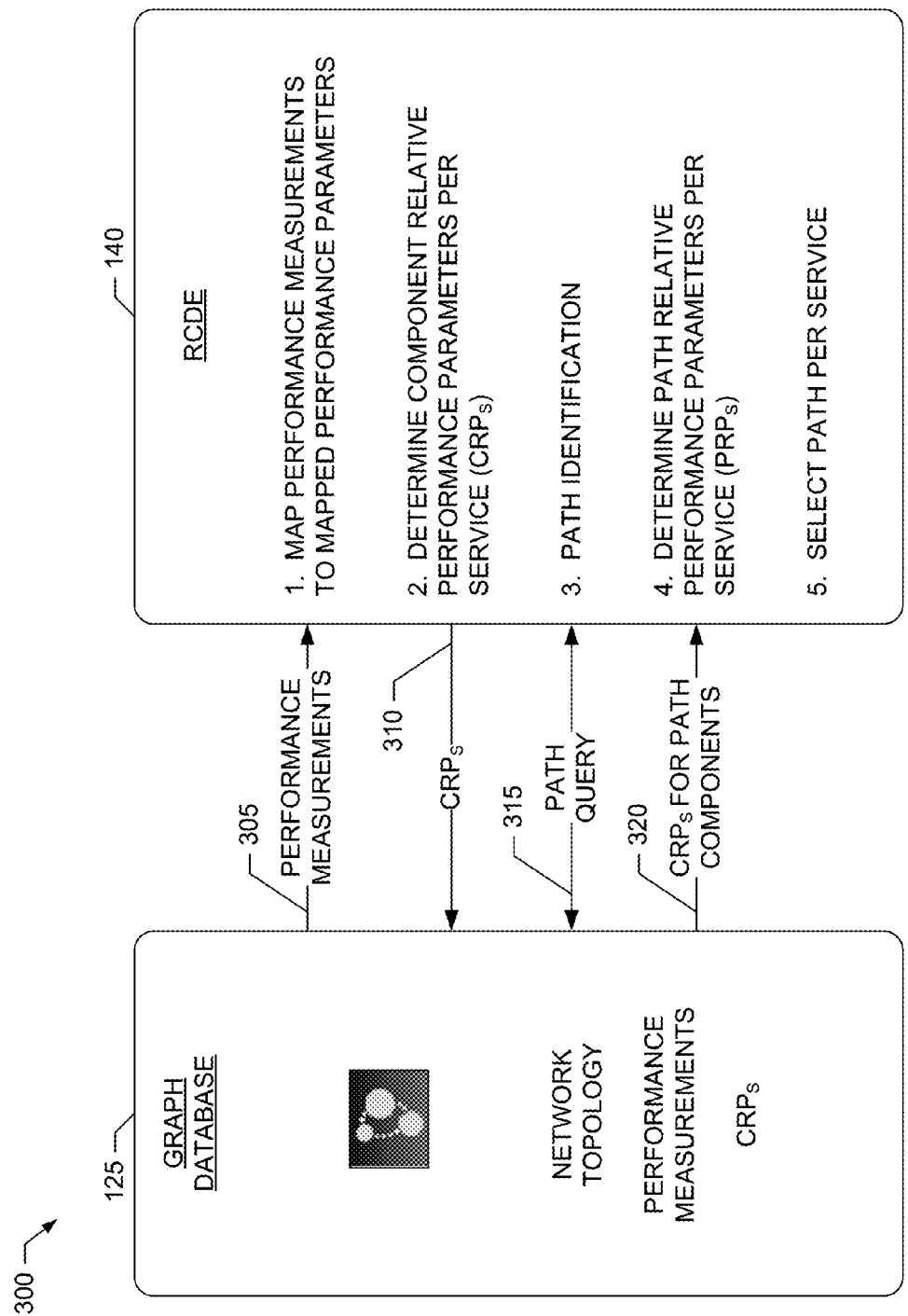
FIG. 3 is a block diagram illustrating example information exchanged between an example graph database and example routing composition determination engine included in the example service specific route selectors of FIGS. 1 and/or 2.

An example block diagram 300 illustrating example information exchanged between the example RCDE 140 and the example graph database 125 of the example service specific route selector 105 of FIG. 1 is illustrated in FIG. 3. In some examples, the graph database interface 205 is used to exchange the information illustrated in FIG. 3. As illustrated in the example block diagram 300 of FIG. 3, the example graph database 125 stores network topology information for the network components 110 included in the network 100. Such network topology information can include, but is not limited to, information describing the nodes and links included in the network 100, their respective characteristics (e.g., such as capacities, bandwidths, etc.) and their arrangement in the network 100 (e.g., such as the interconnections between the nodes and links). The example graph database 125 of FIG. 3 also stores respective sets of performance measurements (e.g., delay, jitter, path loss, bandwidth, reliability, etc.) for the network components 110 represented by the stored topology information. Furthermore, in some examples, the graph database 125 stores respective sets of service-specific CRP parameters determined, as described above, by the example RCDE 140 for the network components 110 represented by the stored topology information.

In the example of FIG. 3, the RCDE 140 uses the example graph database interface 205 to query 305 the graph database 125 to retrieve the sets of performance measurements for the network components 110 represented by the topology information stored in the graph database 125. As disclosed above, the RCDE 140 then (1) maps the retrieved sets of performance measurements to respective sets of mapped performance parameters, and (2) uses the sets of mapped performance parameters to determine respective sets of CRP parameters for the network components 110 (e.g., with a given network component 110 potentially having a different CRP parameter for each different supported service). In the example of FIG. 3, the RCDE 140 uses the example graph database interface 205 to store 310 the respective sets of CRP parameters determined for the respective network components 110 in the graph database 125. For example, the graph database interface 205 may include a set of CRP parameters for a given network component with the topology information for that network component.

As illustrated in the example of FIG. 3, the RCDE 140 also uses the example graph database interface 205 to (3) perform path identification by executing example path queries 315 of the graph database 125 to identify sets of possible paths (e.g., candidate paths) for routing traffic for given services between given pairs of network endpoints. For example, the graph database 125 may employ any appropriate search techniques, pattern matching techniques, graph traversal techniques, etc., to discover possible paths between pairs of endpoints included in the stored topology information. As disclosed above, the RCDE 140 then uses the example graph database interface 205 to query 320 the graph database 125 for the sets of CRP parameters of the network components 110 included in the sets of candidate paths. As disclosed above, the RCDE 140 uses the retrieved sets of CRP parameters to (4) determine respective, service-specific PRP parameters for the candidate paths. As further disclosed above, the RCDE 140 then uses the service-specific PRP parameters determined for the candidate paths to select one or more of the candidate paths for routing traffic for services between pairs of network endpoints.

Figure 4A:
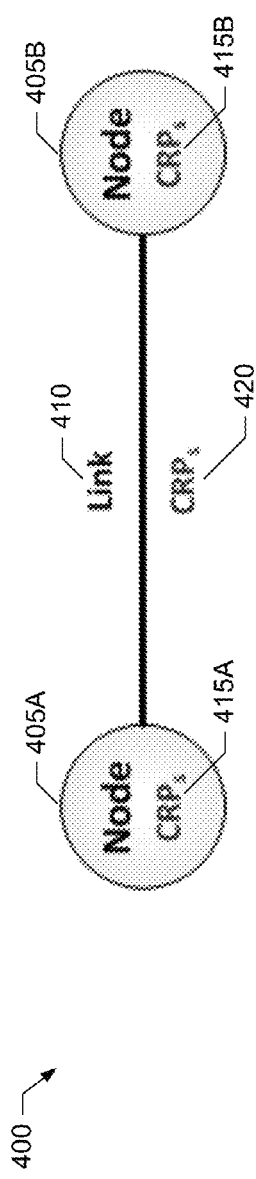
FIGS. 4A-B illustrate example information stored the example graph database of FIGS. 1, 2 and/or 3.
Figure 4B:
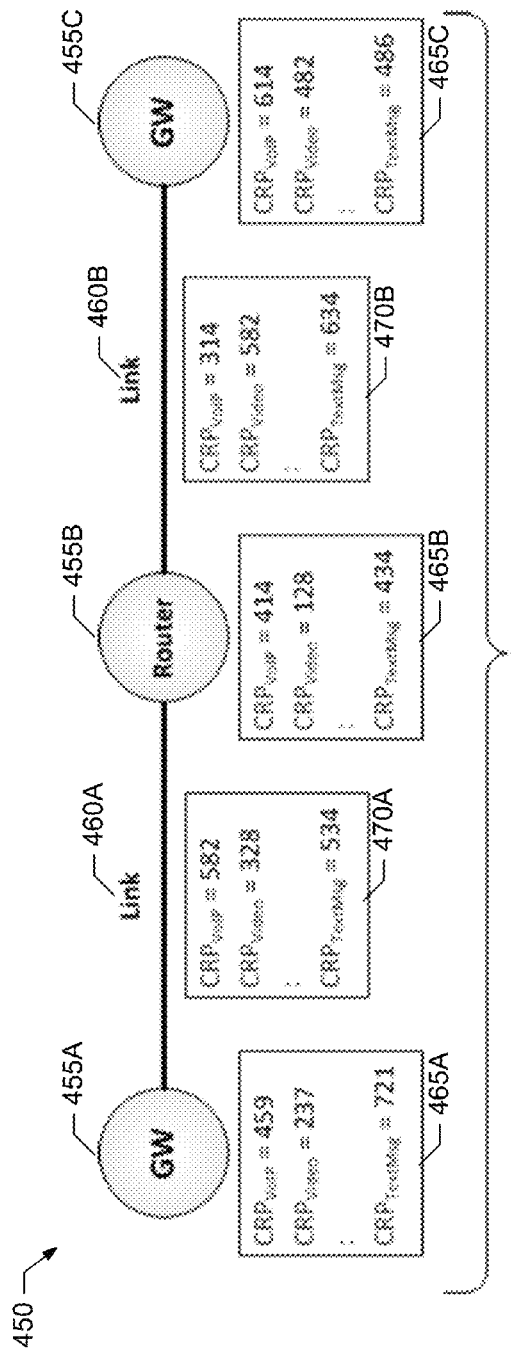

Further examples of topology information 400 and 450 stored in the example graph database is illustrated in FIGS. 4A-B. In the illustrated example of FIG. 4A, the topology information 400 includes information describing example nodes 405A-B and an example link 410. The example topology information 400 also specifies the arrangement (e.g., interconnections) of the example nodes 405A-B and the example link 410. The example topology information 400 further includes example sets of CRPs 415A-B and 420 determined by the example RCDE 140 for the example nodes 405A-B and the example link 410, respectively.

In the illustrated example of FIG. 4B, the topology information 450 includes information describing example nodes 455A-C (e.g., which may be gateways, routers, etc.) and example links 460A-B. The example topology information 450 also specifies the arrangement (e.g., interconnections) of the example nodes 455A-C and the example links 460A-B. The example topology information 450 further includes example sets of CRPs 465A-C and 470A-B determined by the example RCDE 140 for the example nodes 455A-C and the example links 460A-B, respectively. In the illustrated example of FIG. 4B, the respective sets of CRPs 465A-C and 470A-B for the example nodes 455A-C and the example links 460A-B include different CRPs for a VoIP service, a video service, a text messaging service, etc.

Figure 5A:
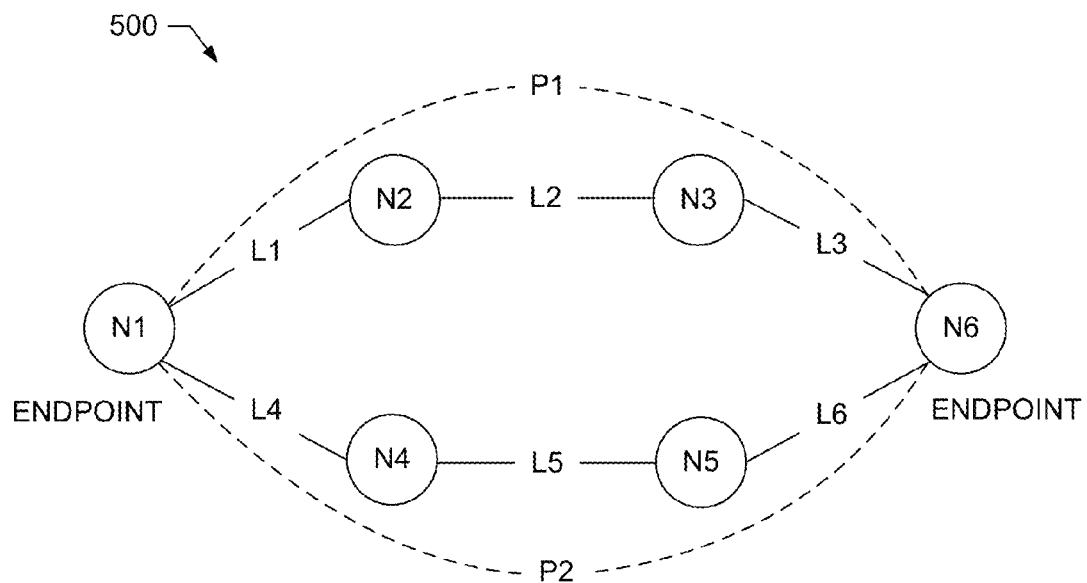
FIGS. 5A-D illustrate example component and path relative performance parameters capable of being determined by the example service specific route selectors of FIGS. 1 and/or 2 to perform service specific route selection in accordance with the teachings of this disclosure.

Further example CRPs and PRPs capable of being determined by the example RCDE 140 of FIGS. 1-3 for different example network topologies are illustrated in FIGS. 5A-D. FIG. 5A illustrates a first example network topology 500 including six (6) example nodes N1 through N6 interconnected by six (6) example links L1 through L6, as shown. In the illustrated example of FIG. 5A, traffic for a service is to be routed between endpoint node N1 and endpoint node N6. In response to a query from the RCDE 140, the example graph database 125 identifies two possible paths, P1 and P2, capable of routing traffic between the pair of endpoint nodes N1 and N6. As shown in the example of FIG. 5A, the path P1 includes nodes N1, N2, N3 and N6, which are interconnected by links L1, L2 and L3, as shown. The path P2 includes nodes N1, N4, N5 and N6, which are interconnected by links L4, L5 and L6, as shown.

Figure 5B:
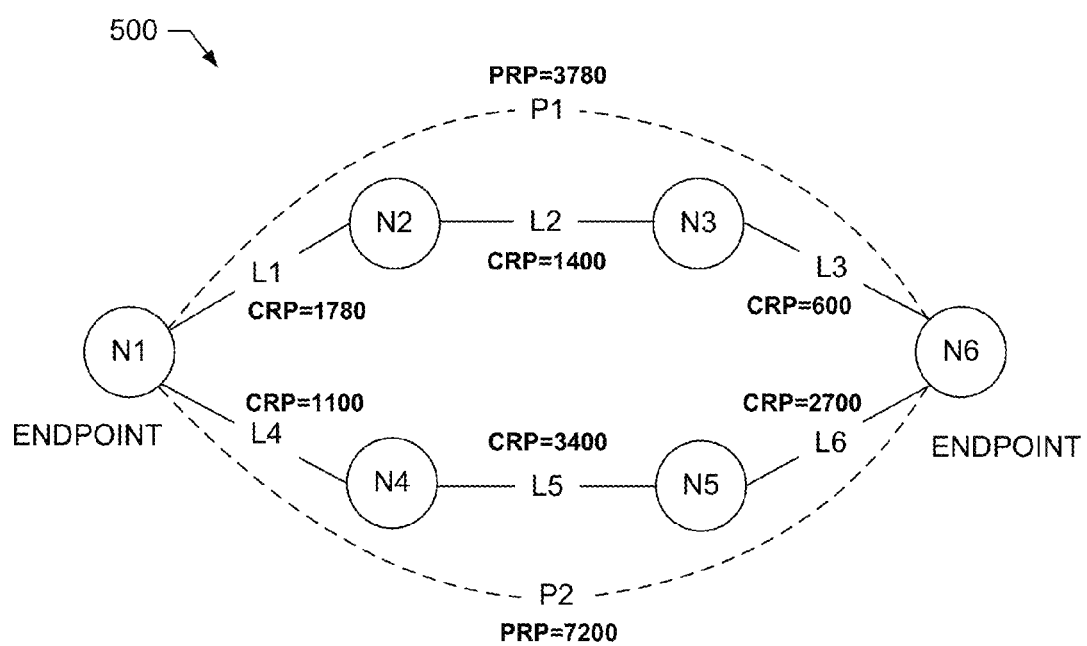

FIG. 5B illustrates example CRP parameters determined by the example RCDE 140 for the network components in the example topology 500, and example PRP parameters determined by the example RCDE 140 for the possible paths P1 and P2. In the illustrated example of FIG. 5B, the CRP parameters for the network nodes N1 through N6 are assumed to have negligible effect on the PRP parameters determined for the possible paths P1 and P2. Accordingly, the CRP parameters for the network nodes N1 through N6 are omitted in FIG. 5B for clarity.

In the example of FIG. 5B, for the service to be routed between endpoint nodes N1 and N6, the RCDE 140 determines, as disclosed above, a CRP of 1780 for link L1, a CRP of 1400 for link L2, a CRP of 600 for L3, a CRP of 1100 for link L4, a CRP of 3400 for link L5 and a CRP of 2700 for link L6. Accordingly, the RCDE 140 determines the PRP for path P1 to be the sum of the CRPs for links L1, L2 and L3, which is:

$$PRP_{P1}=1780+1400+600=3780 \qquad \text{Equation 3}$$

Similarly, the RCDE 140 determines the PRP for path P2 to be the sum of the CRPs for links L4, L5 and L6, which is:

$$PRP_{P2}=1100+3400+2700=7200 \qquad \text{Equation 4}$$

Because the PRP for path P2 is greater than the PRP for path P1, the RCDE 140 selects path P2 for routing the service traffic between the endpoint nodes N1 and N6 in the illustrated example.

Figure 5C:
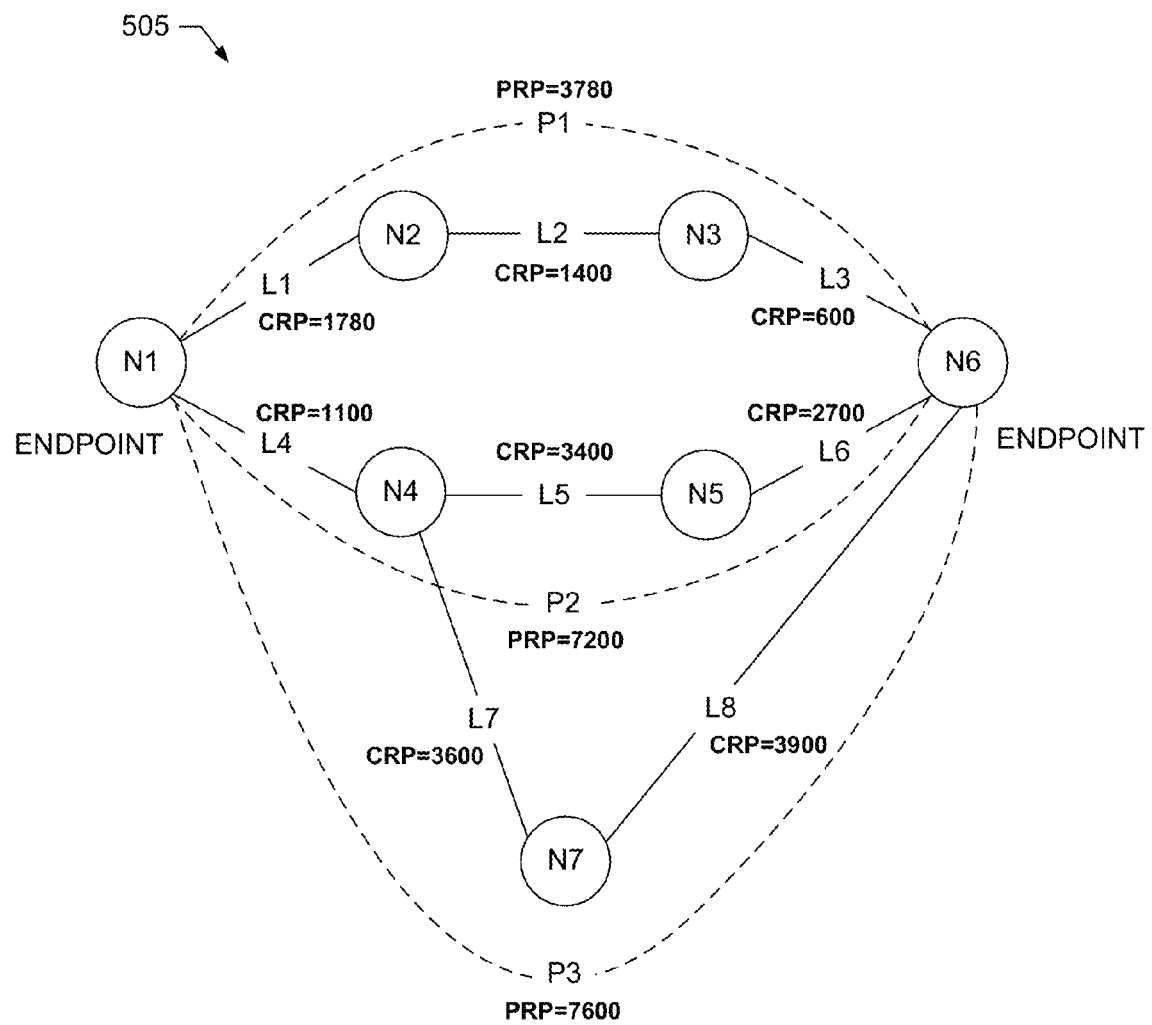

FIG. 5C illustrates a second example network topology 505 in which an example node N7 and example links L7 and L8 are added to the example network topology 500 as shown in the figure. In response to the addition of these new network components to the topology information stored in the graph database 125, the RCDE 140 determines, for the service to be routed between endpoint nodes N1 and N6, a CRP of 3600 for link L7 and a CRP of 3900 for link L8 (the CRP for the node N7 is assumed to be negligible and, thus, is omitted for clarity). In response to another query from the RCDE 140, the example graph database 125 returns path P3 as another possible path for routing traffic between the endpoint nodes N1 and N6. Path P3 includes nodes N1, N4, N7 and N6, which are interconnected by links L4, L7 and L8, as shown. The RCDE 140 further determines the PRP for path P3 to be the sum of the CRPs for links L4, L7 and L8, which is:

$$PRP_{P3}=1100+3600+3900=7600 \qquad \text{Equation 5}$$

Because the PRP for path P3 is greater than the PRPs for path P1 and P2, the RCDE 140 updates its route selection to now select path P3 for routing the service traffic between the endpoint nodes N1 and N6 in the illustrated example.

Figure 5D:
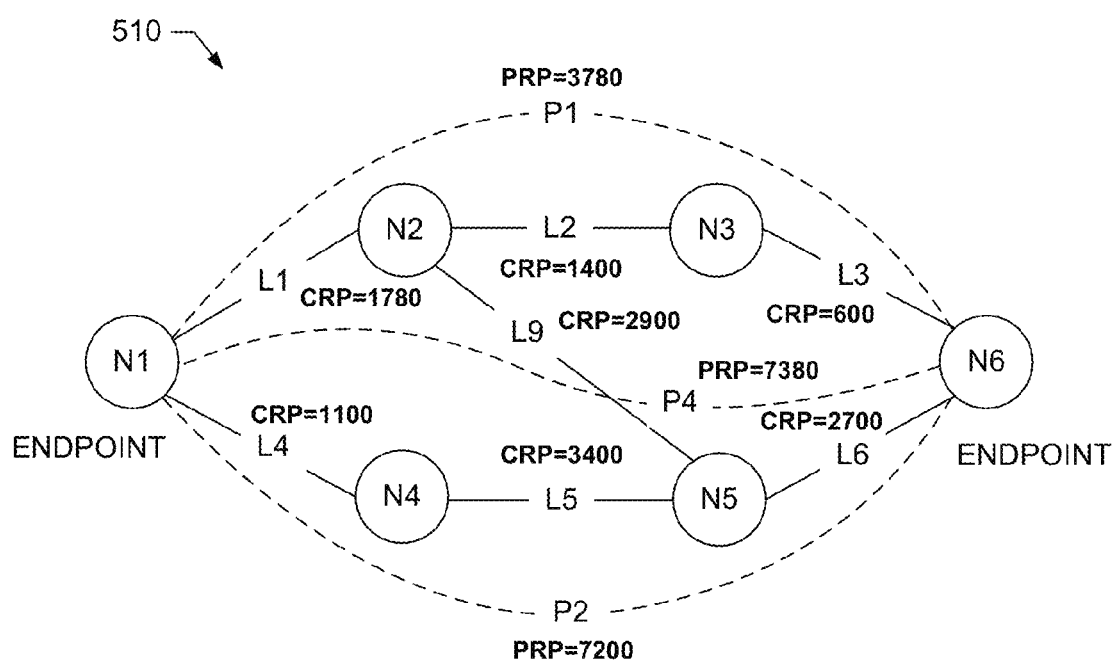

FIG. 5D illustrates a third example network topology 505 in which an example link L9 is added to the example network topology 500 to interconnect example nodes N2 and N5 as shown in the figure. In response to the addition of this new network components to the topology information stored in the graph database 125, the RCDE 140 determines, for the service to be routed between endpoint nodes N1 and N6, a CRP of 2900 for link L9. In response to another query from the RCDE 140, the example graph database 125 returns path P4 as another possible path for routing traffic between the endpoint nodes N1 and N6. Path P4 includes nodes N1, N2, N5 and N6, which are interconnected by links L1, L9 and L6, as shown. The RCDE 140 further determines the PRP for path P4 to be the sum of the CRPs for links L1, L9 and L6, which is:

$$PRP_{P4}=1780+2900+2700=7380 \qquad \text{Equation 6}$$

Because the PRP for path P4 is greater than the PRPs for path P1 and P2, the RCDE 140 updates its route selection to now select path P4 for routing the service traffic between the endpoint nodes N1 and N6 in the illustrated example.

Figure 6:
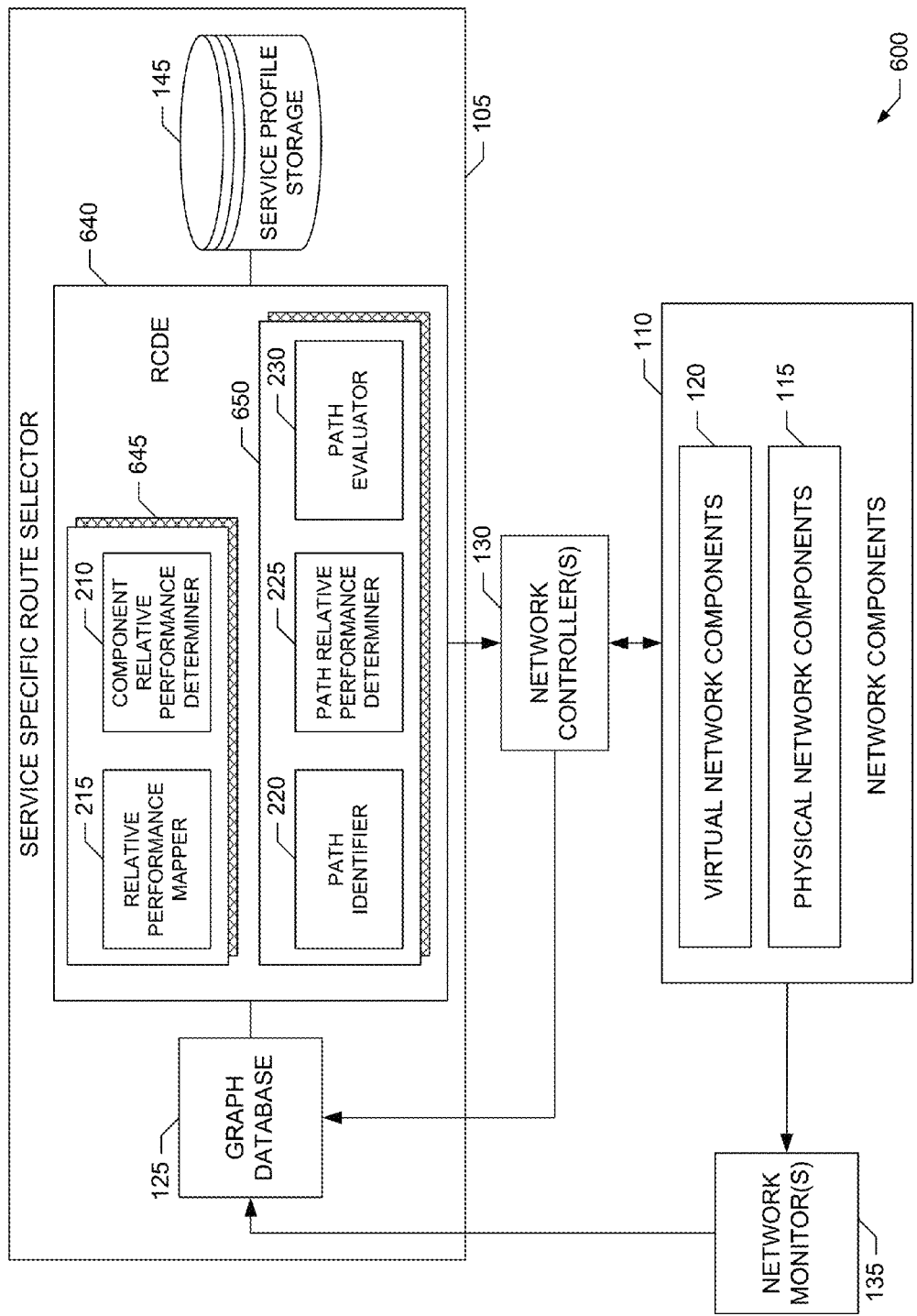
FIG. 6 is a block diagram illustrating a second example implementation of the example service specific route selector of FIG. 1.

An example communication network 600 including a second example implementation of the service specific route selector 105 of FIG. 1 is illustrated in FIG. 6. The example communication network 600 of FIG. 6 includes many elements in common with the example communication network 100 of FIG. 1. As such, like elements in FIGS. 1 and 6 are labeled with the same reference numerals. The detailed descriptions of these like elements are provided above in connection with the discussion of FIG. 1 and, in the interest of brevity, are not repeated in the discussion of FIG. 6.

In the illustrated example of FIG. 6, the service specific route selector 105 includes an example RCDE 640 structured to support parallel processing. More specifically, the example RCDE 640 employs different processors and/or different processing threads to, for example, determine the sets of service-specific CRP parameters for the network components 110 in parallel with determining the respective PRP parameters for different candidate paths for routing different services in the network 600. In this way, the RCDE 640 can continuously update (e.g., in real-time) the routing information in the network 600 as, for example, network components 110 are added/removed, and/or the performance measurements for network components 110 change.

For example, the RCDE 640 of FIG. 6 includes at least two example processors 645 and 650 (or at least two example processing threads 645 and 650) which operate in parallel. In the illustrated example of FIG. 6, the processor 645 implements the example CRP determiner 210 and the example relative performance mapper 215 to determine sets of service-specific CRP parameters for the network components 110. The example processor 650 implements the example path identifier 220, the example PRP determiner 225 and the example path evaluator 230 to determine service-specific PRP parameters for candidate paths identified in the network 600, and to select, based on the PRP parameters, ones of the candidate paths for routing service traffic between endpoints in the network 100. In some examples, the RCDE 640 includes further processors (and/or processing threads) to allow multiple instances of, for example, the example CRP determiner 210 to be executed to determine CRP parameters for different services in parallel. Additionally or alternatively, in some examples, the RCDE 640 includes further processors (and/or processing threads) to allow multiple instances of, for example, the example PRP determiner 225 to be executed to determine PRP parameters for different candidate paths in parallel. The example processor 645 and/or 650 may be implemented by any number(s), type(s) and/or combination(s) of processors, such as the example processor 1012 of FIG. 10, which is described in further detail below.

While example manners of implementing the example service specific route selector 105 is illustrated in FIGS. 1-6, one or more of the elements, processes and/or devices illustrated in FIGS. 1-6 may be combined, divided, rearranged, omitted, eliminated and/or implemented in any other way. Further, the example network components 110, the example graph database 125, the example network controller(s) 130, the example network monitor(s) 135, the example RCDEs 140 and/or 640, the example service profile storage 145, the example graph database interface 205, the example CRP determiner 210, the example relative performance mapper 215, the example path identifier 220, the example PRP determiner 225, the example path evaluator 230, the example processors 645 and/or 650, and/or, more generally, the example service specific route selector 105 of FIGS. 1-6 may be implemented by hardware, software, firmware and/or any combination of hardware, software and/or firmware. Thus, for example, any of the example network components 110, the example graph database 125, the example network controller(s) 130, the example network monitor(s) 135, the example RCDEs 140 and/or 640, the example service profile storage 145, the example graph database interface 205, the example CRP determiner 210, the example relative performance mapper 215, the example path identifier 220, the example PRP determiner 225, the example path evaluator 230, the example processors 645 and/or 650, and/or, more generally, the example service specific route selector 105 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example service specific route selector 105, the example network components 110, the example graph database 125, the example network controller(s) 130, the example network monitor(s) 135, the example RCDEs 140 and/or 640, the example service profile storage 145, the example graph database interface 205, the example CRP determiner 210, the example relative performance mapper 215, the example path identifier 220, the example PRP determiner 225, the example path evaluator 230, and/or the example processors 645 and/or 650 is/are hereby expressly defined to include a tangible computer readable storage device or storage disk such as a memory, a digital versatile disk (DVD), a compact disk (CD), a Blu-ray disk, etc. storing the software and/or firmware. Further still, the example service specific route selector 105 may include one or more elements, processes and/or devices in addition to, or instead of, those illustrated in FIGS. 1-6, and/or may include more than one of any or all of the illustrated elements, processes and devices.

Figure 7:
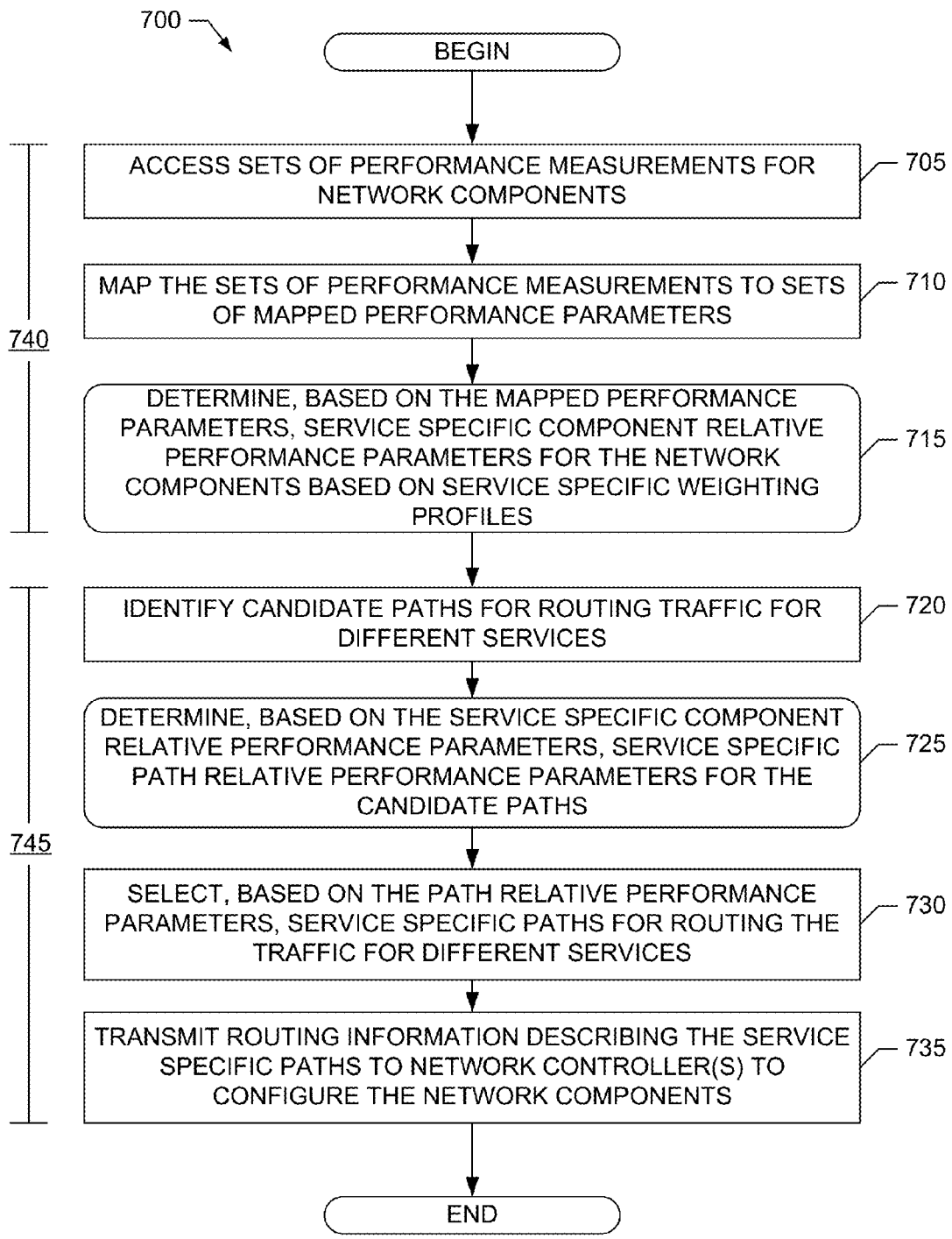
FIG. 7 is a flowchart representative of example machine readable instructions that may be executed to implement the example service specific route selectors of FIGS. 1, 2 and/or 6.
Figure 8:
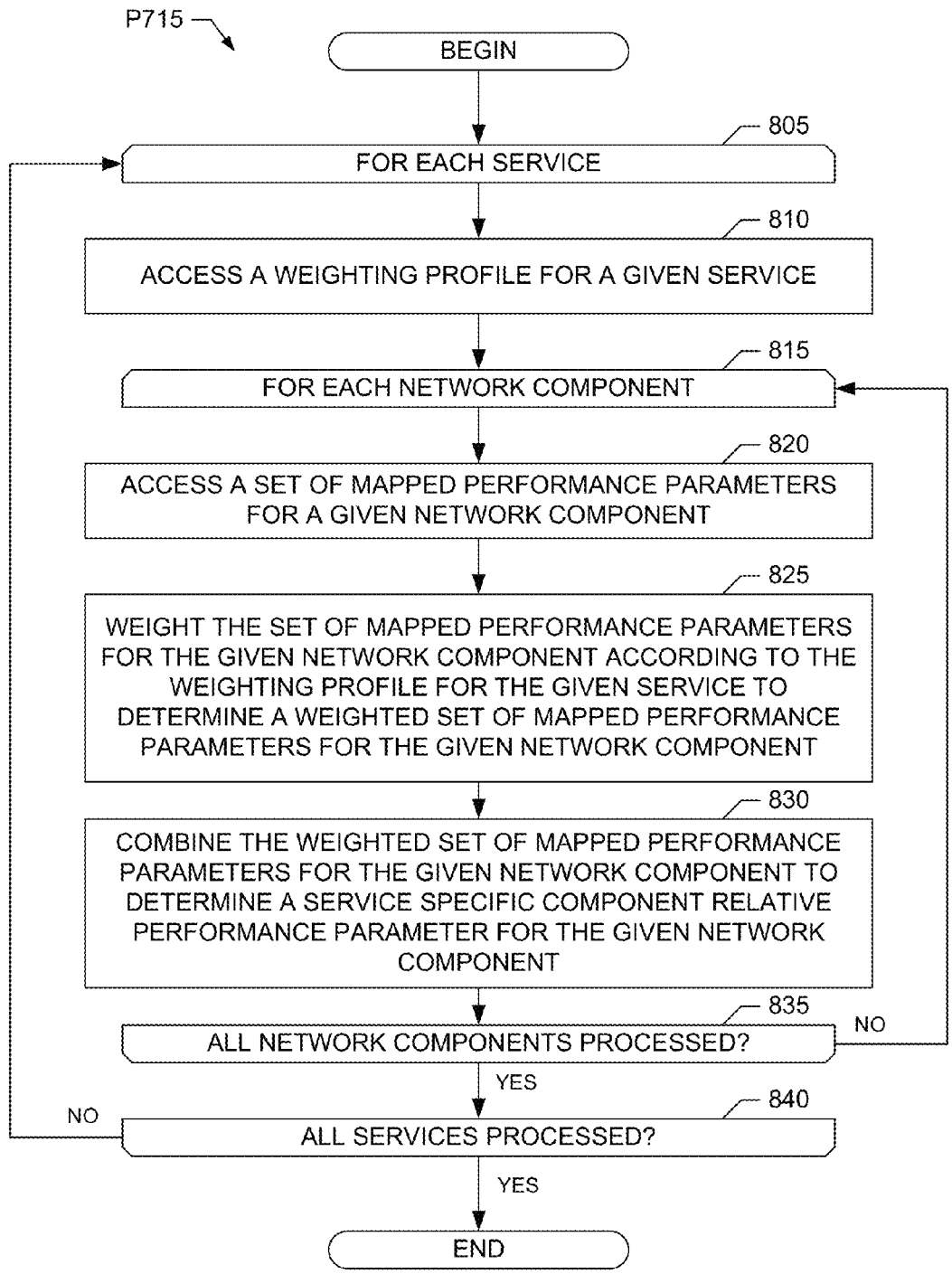
FIG. 8 is a flowchart representative of example machine readable instructions that may be executed to implement an example component relative performance determiner included in the example service specific route selectors of FIGS. 2 and/or 6.
Figure 9:
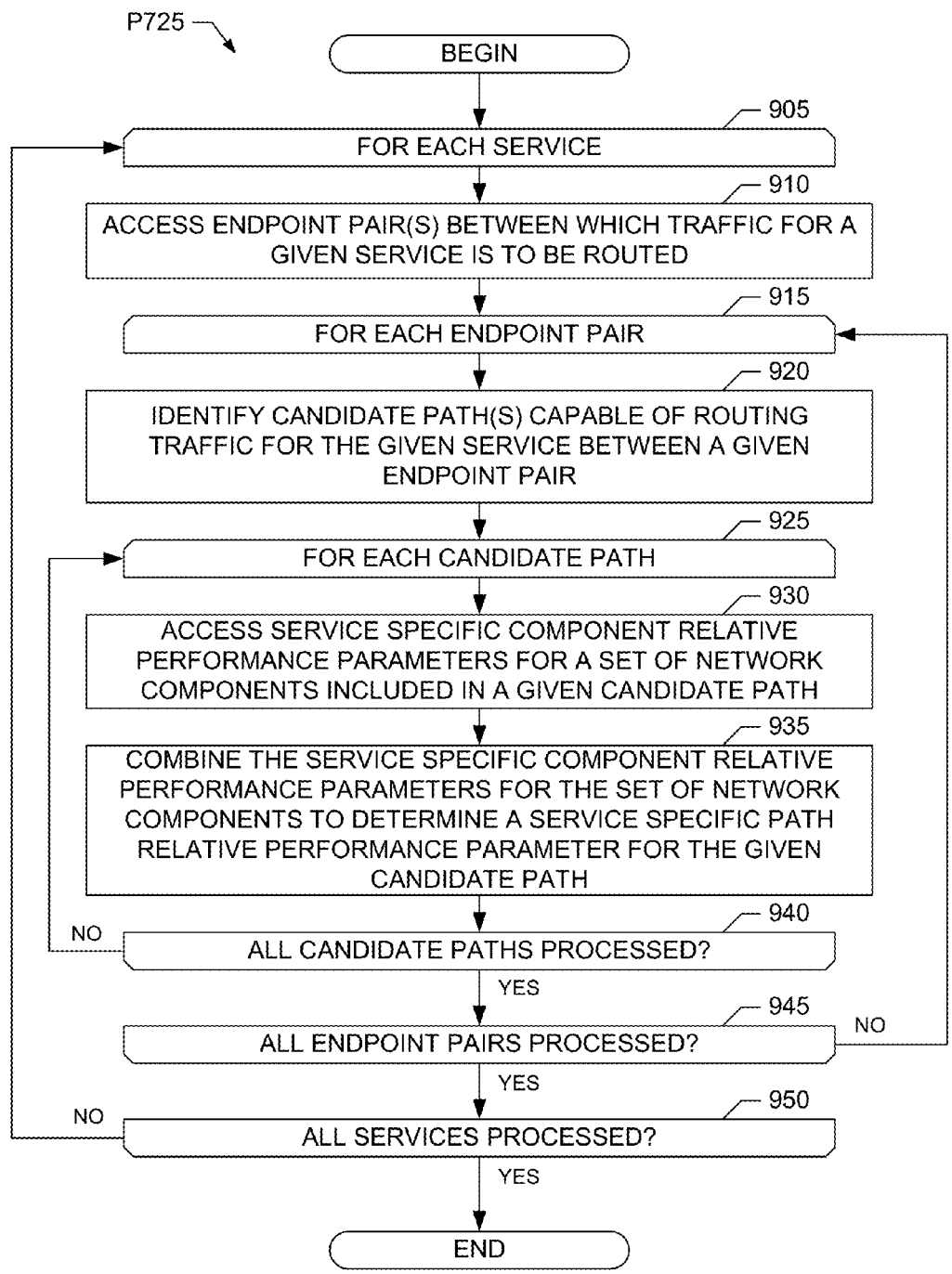
FIG. 9 is a flowchart representative of example machine readable instructions that may be executed to implement an example path relative performance determiner included in the example service specific route selectors of FIGS. 2 and/or 6.

Flowcharts representative of example machine readable instructions for implementing the example service specific route selector 105, the example network components 110, the example graph database 125, the example network controller(s) 130, the example network monitor(s) 135, the example RCDEs 140 and/or 640, the example service profile storage 145, the example graph database interface 205, the example CRP determiner 210, the example relative performance mapper 215, the example path identifier 220, the example PRP determiner 225, the example path evaluator 230, and/or the example processors 645 and/or 650 are shown in FIGS. 7-9. In these examples, the machine readable instructions comprise one or more programs for execution by a processor, such as the processor 1012 shown in the example processor platform 1000 discussed below in connection with FIG. 10. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 1012, but the entire program or programs and/or portions thereof could alternatively be executed by a device other than the processor 1012 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-9, many other methods of implementing the example service specific route selector 105, the example network components 110, the example graph database 125, the example network controller(s) 130, the example network monitor(s) 135, the example RCDEs 140 and/or 640, the example service profile storage 145, the example graph database interface 205, the example CRP determiner 210, the example relative performance mapper 215, the example path identifier 220, the example PRP determiner 225, the example path evaluator 230, and/or the example processors 645 and/or 650 may alternatively be used. For example, with reference to the flowcharts illustrated in FIGS. 7-9, the order of execution of the blocks may be changed, and/or some of the blocks described may be changed, eliminated, combined and/or subdivided into multiple blocks.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-9 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 700 that may be executed to implement the example service specific route selector 105 of FIGS. 1-6 is represented by the flowchart shown in FIG. 7. With reference to the preceding figures and associated written descriptions, the example program 700 of FIG. 7 begins execution at block 705 at which the example RCDE 140 of the service specific route selector 105 queries the example graph database 125 of the service specific route selector 105 to access respective sets of performance measurements for the network components 110 included in the network 100. At block 710, the RCDE 140 maps the sets of performance measurements accessed at block 705 to corresponding sets of mapped performance parameters, as described above. At block 715, the RCDE 140 determines (e.g., according to Equation 1, as described above) respective sets of service specific CRP parameters for the network components 110 based on the sets of mapped performance parameters determined at block 710 and the service specific weighting profiles accessed from the example service profile storage 145 of the service specific route selector 105. An example program that may be executed to perform the processing at block 715 is illustrated in FIG. 8 and described in further detail below.

At block 720, the RCDE 140 queries the graph database 125 to identify one or more sets of candidate paths capable of routing traffic for one or more services between one or more pairs of endpoints in the network 100. At block 725, the RCDE 140 determines (e.g., according to Equation 2, as described above) respective service specific PRP parameters for the identified candidate paths based on the service specific CRP parameters determined at block 715 for the network components 110. An example program that may be executed to perform the processing at block 725 is illustrated in FIG. 9 and described in further detail below. At block 730, the RCDE 140 selects, based on the service specific PRP parameters determined at block 725, paths for routing traffic for one or more services between one or more pairs of endpoints from the set(s) of candidate paths identified at block 720. At block 735, the RCDE 140 transmits routing information describing the selected, service specific paths to, for example, the network controller(s) 130 to enable the network components 110 to be configured to route traffic according to the selected paths.

In the illustrated example of FIG. 7, the example program 700 is depicted as being executed sequentially. However, execution of the example program 700 is not limited thereto. For example, the program 700 supports parallel execution by two or more parallel processing threads. For example, the processing at one or more of blocks 705-715 may be performed by a first example processing thread 740, whereas the processing at one or more of blocks 720-735 may be performed by a second example processing thread 745 executing in parallel with the first processing thread 740. Such an example implementation permits processing related to determining the sets of service specific CRP parameters for the network components 110 and processing related to determining the service specific PRP parameters for the candidate paths to be performed in parallel. Other parallel processing arrangements, such as those described above in connection with FIG. 6, are supported by the example program 700 of FIG. 7.

An example program P715 that may be executed to implement the example CRP determiner 210 of FIGS. 2 and/or 6, and/or to perform the processing at block 715 of FIG. 7, is illustrated in FIG. 8. With reference to the preceding figures and associated written descriptions, the example program P715 of FIG. 8 begins execution at block 805 at which the CRP determiner 210 begins determining service specific CRP parameters corresponding to different services for which traffic is to be routed by the network components 110 included in the network 100. For example, at block 810 the CRP determiner 210 accesses (e.g., from the example service profile storage 145) a weighting profile specifying a sets of weights (e.g., $W_{s,p}$) for a given service (e.g., s). At block 815, the CRP determiner 210 begins determining the CRP parameters corresponding to the given service for the network components 110.

For example, at block 820, the CRP determiner 210 accesses, for a given network component 110, a set of mapped performance parameters (e.g., determined by the example relative performance mapper 215). At block 825, the CRP determiner 210 weights, as described above, the set of mapped performance parameters (e.g., $MP_{n,p}$) for the given network component 110 (e.g., n) according to the weighting profile (e.g., $W_{s,p}$) for the given service (e.g., s) to determine a weighted set of mapped performance parameters (e.g., $W_{s,p} \times MP_{n,p}$) for the given network component 110 (e.g., n). At block 830, the CRP determiner 210 combines (e.g., sums according to Equation 1, and/or multiplies, etc.) the weighted set of mapped performance parameters determined at block 825 for the given component to determine a CRP parameter (e.g., $CRP_{n,s}$) for the given network component 110 (e.g., n), which is specific to the given service (e.g., s). In some examples, at block 830 the CRP determiner 210 also stores the determined CRP parameter in, for example, the graph database 125 (e.g., with the topology information for the given network component 110). At block 835, the CRP determiner 210 continues processing until CRP parameters corresponding to the given service (e.g., s) are determined for all of the network components 110. At block 840, the CRP determiner 210 continues processing until CRP parameters are determined for all of the services for which traffic is to be routed in the network 100.

An example program P725 that may be executed to implement the example PRP determiner 225 of FIGS. 2 and/or 6, and/or to perform the processing at block 725 of FIG. 7, is illustrated in FIG. 9. With reference to the preceding figures and associated written descriptions, the example program P725 of FIG. 9 begins execution at block 905 at which the PRP determiner 225 begins processing to select paths for routing traffic for different services in the network 100. For example, at block 910 the PRP determiner 225 accesses (e.g., from the example graph database 125) pairs of endpoints in the network 100 between which traffic for a given service (e.g., s) is to be routed. At block 915, the PRP determiner 225 begins processing to select one or more paths for routing traffic for the given service, s, between each pair of endpoints.

For example, at block 920, the PRP determiner 225 queries the example graph database 125 to identify a set of candidate paths capable of routing traffic for the given service (e.g., s) between a given pair of endpoint nodes. At block 925, the PRP determiner 225 begins determining service specific PRP parameters for the candidate paths identified at block 920. For example, at block 930 the PRP determiner 225 accesses (e.g., from the example graph database 125 and/or the example CRP determiner 210) the CRP parameters (e.g., $CRP_{n,s}$), which correspond to the given service (e.g., s), for the network components 110 (e.g., n) included in a given candidate path (e.g., r). At block 935, the PRP determiner 225 combines (e.g., sums according to Equation 2, and/or multiplies, etc.) the CRP parameters (e.g., $CRP_{n,s}$) for the network components 110 (e.g., n) included in the given candidate path (e.g., r) to determine a PRP parameter (e.g., $PRP_{r,s}$) for the given candidate path (e.g., r), which is specific to the given service (e.g., s). At block 940, the PRP determiner 225 continues processing until PRP parameters corresponding to the given service (e.g., s) are determined for all candidate paths identified at block 920. At block 945, the PRP determiner 225 continues processing until all pairs of endpoints between which traffic for the given service (e.g., s) is to be routed have been processed. At block 945, the PRP determiner 225 continues processing until all services for which traffic is to be routed in the network have been processed.

Figure 10:
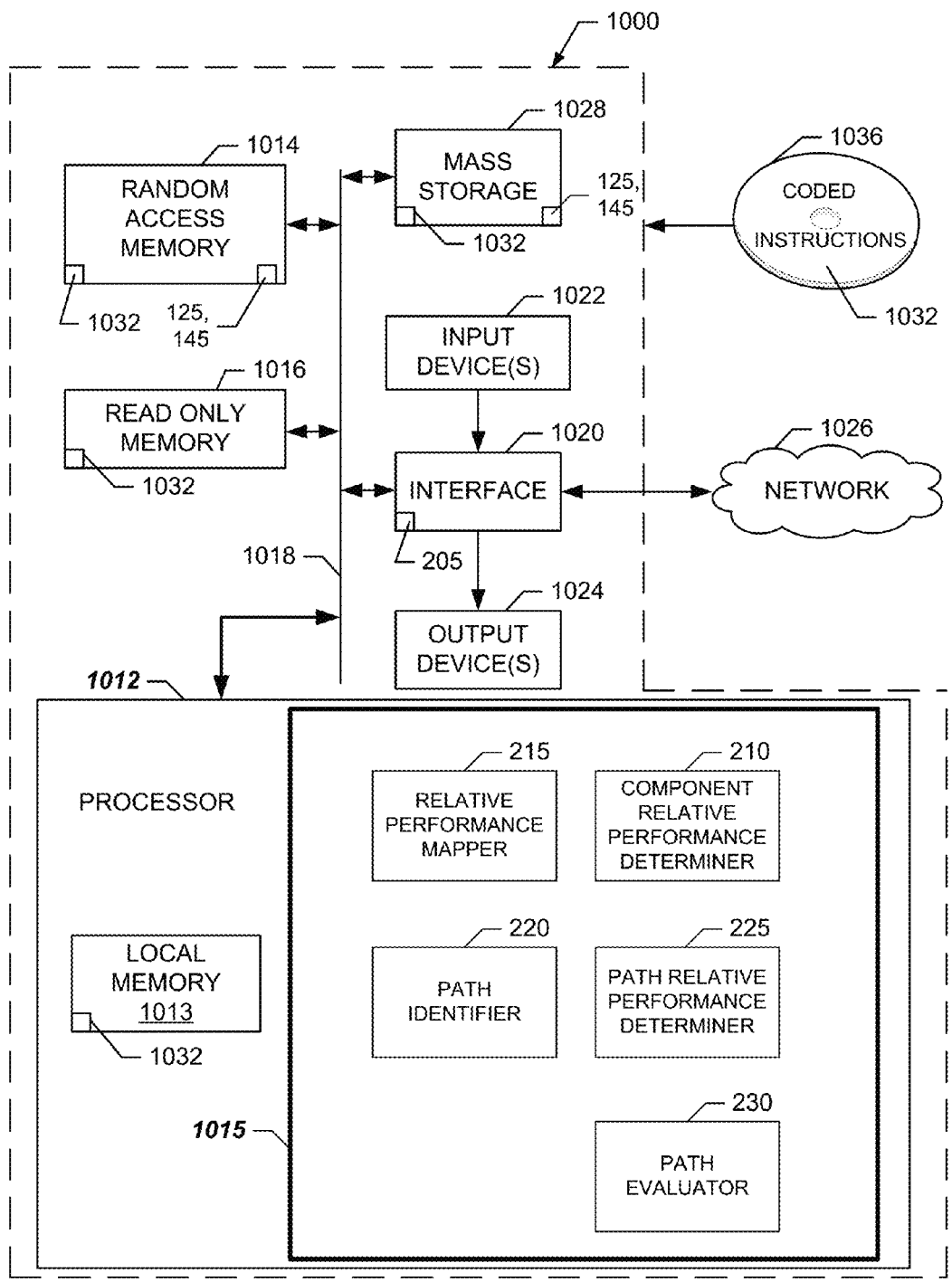
FIG. 10 is a block diagram of an example processor platform structured to execute the example machine readable instructions of FIGS. 7, 8 and/or 9 to implement the example service specific route selectors of FIGS. 1, 2 and/or 6, the example component relative performance determiners of FIGS. 2 and/or 6, and/or the example path relative performance determiners of FIGS. 2 and/or 6.

FIG. 10 is a block diagram of an example processor platform 1000 capable of executing the instructions of FIGS. 7-9 to implement the example service specific route selector 105 of FIGS. 1-6. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 includes one or more example processing cores 1015 configured via example instructions 1032, which include the example instructions of FIGS. 7, 8 and/or 9, to implement the example CRP determiner 210, the example relative performance mapper 215, the example path identifier 220, the example PRP determiner 225, the example path evaluator 230 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In the illustrated example of FIG. 10, the interface circuit 1020 is also structured to implement the example graph database interface 205.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and digital versatile disk (DVD) drives. In some examples, the mass storage device 1030 may implement the example graph database 125 and/or the example service profile storage 145. Additionally or alternatively, in some examples the volatile memory 1018 may implement the example graph database 125 and/or the example service profile storage 145.

Coded instructions 1032 corresponding to the instructions of FIGS. 7-9 may be stored in the mass storage device 1028, in the volatile memory 1014, in the non-volatile memory 1016, in the local memory 1013 and/or on a removable tangible computer readable storage medium, such as a CD or DVD 1036.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A route selection method comprising:
   determining, by executing an instruction with a processor, respective component performance parameters for network components of a communication network based on a weighting profile for a first service of a plurality of different services for which traffic is to be routed in the communication network, the respective component performance parameters characterizing the performance of the network components for routing traffic for the first service relative to the performance of the network components for routing traffic for others of the plurality of different services;
   determining, by executing an instruction with the processor, and based on the component performance parameters, respective path performance parameters for a plurality of candidate paths between two endpoints in the communication network; and
   selecting, by executing an instruction with the processor, and based on the path performance parameters, a first one of the candidate paths to route traffic for the first service between the two endpoints, the processor being in communication with memory storing the instructions.

2. The method of claim 1, wherein determining the component performance parameters includes:
   determining a set of mapped performance parameters from a set of performance measurements associated with a first one of the network components;
   weighting the set of mapped performance parameters based on the weighting profile to determine a weighted set of mapped performance parameters associated with the first service; and
   combining the weighted set of mapped performance parameters to determine a first one of the component performance parameters for the first one of the network components.

3. The method of claim 2, wherein determining the set of mapped performance parameters includes:
   performing a first mapping to map a first one of the set of performance measurements to a first one of the set of mapped performance parameters; and
   performing a second mapping, different from the first mapping, to map a second one of the set of performance measurements to a second one of the set of mapped performance parameters.

4. The method of claim 1, wherein determining the path performance parameters includes:
   combining a first plurality of component performance parameters for a first plurality of network components included in a first one of the candidate paths to determine a first one of the path performance parameters for the first one of the candidate paths; and
   combining a second plurality of component performance parameters for a second plurality of network components included in a second one of the candidate paths to determine a second one of the path performance parameters for the second one of the candidate paths.

5. The method of claim 1, further including querying a graphical database storing topology information for the communication network to obtain performance measurements for the network components and to identify the plurality of candidate paths, and wherein determining the component performance parameters includes determining a first one of the component performance parameters for a first one of the network components by combining the performance measurements for the first one of the network components based on the weighting profile associated with the first service.

6. The method of claim 1, wherein the weighting profile is a first weighting profile, the component performance parameters are first component performance parameters, the path performance parameters are first path performance parameters, and further including:
 determining respective second component performance parameters for the network components based on a second weighting profile, different from the first weighting profile, associated with a second service from the plurality of different services;
 determining, based on the second component performance parameters, respective second path performance parameters for the plurality of candidate paths between the two endpoints in the communication network; and
 selecting, based on the second path performance parameters, a second one of the candidate paths, different from the first one of the candidate paths, to route traffic for the second service between the two endpoints.

7. The method of claim 1, further including transmitting routing information descriptive of the first one of the candidate paths to at least a first plurality of network components implementing the first one of the candidate paths to cause the traffic for the first service to be routed between the two endpoints according to the first one of the candidate paths.

8. A tangible machine readable storage medium comprising machine readable instructions which, when executed, cause a machine to perform operations comprising:
 determining respective component performance parameters for network components of a communication network based on a weighting profile for a first service of a plurality of different services for which traffic is to be routed in the communication network, the respective component performance parameters characterizing the performance of the network components for routing traffic for the first service relative to the performance of the network components for routing traffic for others of the plurality of different services;
 determining, based on the component performance parameters, respective path performance parameters for a plurality of candidate paths between two endpoints in the communication network; and
 selecting, based on the path performance parameters, a first one of the candidate paths to route traffic for the first service between the two endpoints.

9. The tangible machine readable storage medium of claim 8, wherein determining the component performance parameters includes:
 determining a set of mapped performance parameters from a set of performance measurements associated with a first one of the network components;
 weighting the set of mapped performance parameters based on the weighting profile to determine a weighted set of mapped performance parameters associated with the first service; and
 combining the weighted set of mapped performance parameters to determine a first one of the component performance parameters for the first one of the network components.

10. The tangible machine readable storage medium of claim 9, wherein determining the set of mapped performance parameters includes:
 performing a first mapping to map a first one of the set of performance measurements to a first one of the set of mapped performance parameters; and
 performing a second mapping, different from the first mapping, to map a second one of the set of performance measurements to a second one of the set of mapped performance parameters.

11. The tangible machine readable storage medium of claim 8, wherein determining the path performance parameters includes:
 combining a first plurality of component performance parameters for a first plurality of network components included in a first one of the candidate paths to determine a first one of the path performance parameters for the first one of the candidate paths; and
 combining a second plurality of component performance parameters for a second plurality of network components included in a second one of the candidate paths to determine a second one of the path performance parameters for the second one of the candidate paths.

12. The tangible machine readable storage medium of claim 8, wherein the operations further include querying a graphical database storing topology information for the communication network to obtain performance measurements for the network components and to identify the plurality of candidate paths, and wherein determining the component performance parameters includes determining a first one of the component performance parameters for a first one of the network components by combining the performance measurements for the first one of the network components based on the weighting profile associated with the first service.

13. The tangible machine readable storage medium of claim 8, wherein the weighting profile is a first weighting profile, the component performance parameters are first component performance parameters, the path performance parameters are first path performance parameters, and the operations further include:
 determining respective second component performance parameters for the network components based on a second weighting profile, different from the first weighting profile, associated with a second service from the plurality of different services;
 determining, based on the second component performance parameters, respective second path performance parameters for the plurality of candidate paths between the two endpoints in the communication network; and
 selecting, based on the second path performance parameters, a second one of the candidate paths, different from the first one of the candidate paths, to route traffic for the second service between the two endpoints.

14. The tangible machine readable storage medium of claim 8, wherein the operations further include transmitting routing information descriptive of the first one of the candidate paths to at least a first plurality of network components implementing the first one of the candidate paths to cause the traffic for the first service to be routed between the two endpoints according to the first one of the candidate paths.

15. An apparatus to perform route selection, the apparatus comprising:
 memory including machine readable instructions; and
 a processor in communication with the memory, the processor to execute the machine readable instructions to perform operations including:
  determining respective component performance parameters for network components of a communication network based on a weighting profile for a first service of a plurality of different services for which traffic is to be routed in the communication network, the respective component performance parameters characterizing the performance of the network components for routing traffic associated with the first service relative to the performance of the network components for routing traffic associated with others of the plurality of different services;

determining, based on the component performance parameters, respective path performance parameters for a plurality of candidate paths between two endpoints in the communication network; and selecting, based on the path performance parameters, a first one of the candidate paths to route traffic for the first service between the two endpoints.

16. The apparatus of claim 15, wherein determining the component performance parameters includes:

determining a set of mapped performance parameters from a set of performance measurements associated with a first one of the network components;

weighting the set of mapped performance parameters based on the weighting profile to determine a weighted set of mapped performance parameters associated with the first service; and combining the weighted set of mapped performance parameters to determine a first one of the component performance parameters for the first one of the network components.

17. The apparatus of claim 16, wherein determining the set of mapped performance parameters includes:

performing a first mapping to map a first one of the set of performance measurements to a first one of the set of mapped performance parameters; and performing a second mapping, different from the first mapping, to map a second one of the set of performance measurements to a second one of the set of mapped performance parameters.

18. The apparatus of claim 15, wherein determining the path performance parameters includes:

combining a first plurality of component performance parameters for a first plurality of network components included in a first one of the candidate paths to determine a first one of the path performance parameters for the first one of the candidate paths; and combining a second plurality of component performance parameters for a second plurality of network components included in a second one of the candidate paths to determine a second one of the path performance parameters for the second one of the candidate paths.

19. The apparatus of claim 15, wherein the operations further include querying a graphical database storing topology information for the communication network to obtain performance measurements for the network components and to identify the plurality of candidate paths, and wherein determining the component performance parameters includes determining a first one of the component performance parameters for a first one of the network components by combining the performance measurements for the first one of the network components based on the weighting profile associated with the first service.

20. The apparatus of claim 15, wherein the weighting profile is a first weighting profile, the component performance parameters are first component performance parameters, the path performance parameters are first path performance parameters, and the operations further include:

determining respective second component performance parameters for the network components based on a second weighting profile, different from the first weighting profile, associated with a second service from the plurality of different services;

determining, based on the second component performance parameters, respective second path performance parameters for the plurality of candidate paths between the two endpoints in the communication network; and selecting, based on the second path performance parameters, a second one of the candidate paths, different from the first one of the candidate paths, to route traffic for the second service between the two endpoints.

* * * * *